(12) United States Patent
Whitehead

(10) Patent No.: US 7,177,776 B2
(45) Date of Patent: Feb. 13, 2007

(54) SYSTEM AND METHOD FOR DEVELOPING AND PROCESSING BUILDING SYSTEM CONTROL SOLUTIONS

(75) Inventor: Joseph Whitehead, Palatine, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 82 days.

(21) Appl. No.: 10/749,858

(22) Filed: Dec. 31, 2003

(65) Prior Publication Data

US 2004/0249597 A1    Dec. 9, 2004

Related U.S. Application Data

(60) Provisional application No. 60/477,093, filed on Jun. 9, 2003, provisional application No. 60/473,453, filed on May 27, 2003.

(51) Int. Cl.
*G01R 27/28* (2006.01)

(52) U.S. Cl. .................................................. 702/118

(58) Field of Classification Search .............. 702/33, 702/45, 82, 98, 99, 118; 700/86, 275–277; 236/49.3, 51, 25, 45, 49.5

See application file for complete search history.

(56) References Cited

U.S. PATENT DOCUMENTS

| | | | | |
|---|---|---|---|---|
| 5,446,677 | A * | 8/1995 | Jensen et al. | 700/277 |
| 5,481,481 | A * | 1/1996 | Frey et al. | 702/82 |
| 5,605,280 | A * | 2/1997 | Hartman | 236/49.3 |
| 5,682,329 | A * | 10/1997 | Seem et al. | 700/276 |
| 6,241,156 | B1 * | 6/2001 | Kline et al. | 236/49.3 |
| 6,250,560 | B1 * | 6/2001 | Kline et al. | 236/49.3 |
| 2003/0146289 | A1 * | 8/2003 | Sekhar et al. | 236/49.3 |
| 2004/0158359 | A1 * | 8/2004 | Frecska et al. | 700/276 |
| 2004/0167672 | A1 * | 8/2004 | McIlhany et al. | 700/275 |
| 2004/0186599 | A1 * | 9/2004 | Ahmed et al. | 700/86 |
| 2004/0210348 | A1 * | 10/2004 | Imhof et al. | 700/275 |
| 2005/0258259 | A1 * | 11/2005 | Stanimirovic | 236/49.1 |

* cited by examiner

*Primary Examiner*—Michael Nghiem
*Assistant Examiner*—Aditya Bhat

(57) ABSTRACT

A test tool enables the testing of multiple variable air volume (VAV) boxes from a single location in a building environmental system. The test tool includes a building level network interface and a test program for sending a test parameter to a plurality of VAV boxes so that measurements of air flow characteristics may be obtained at the plurality of VAV boxes.

20 Claims, 18 Drawing Sheets

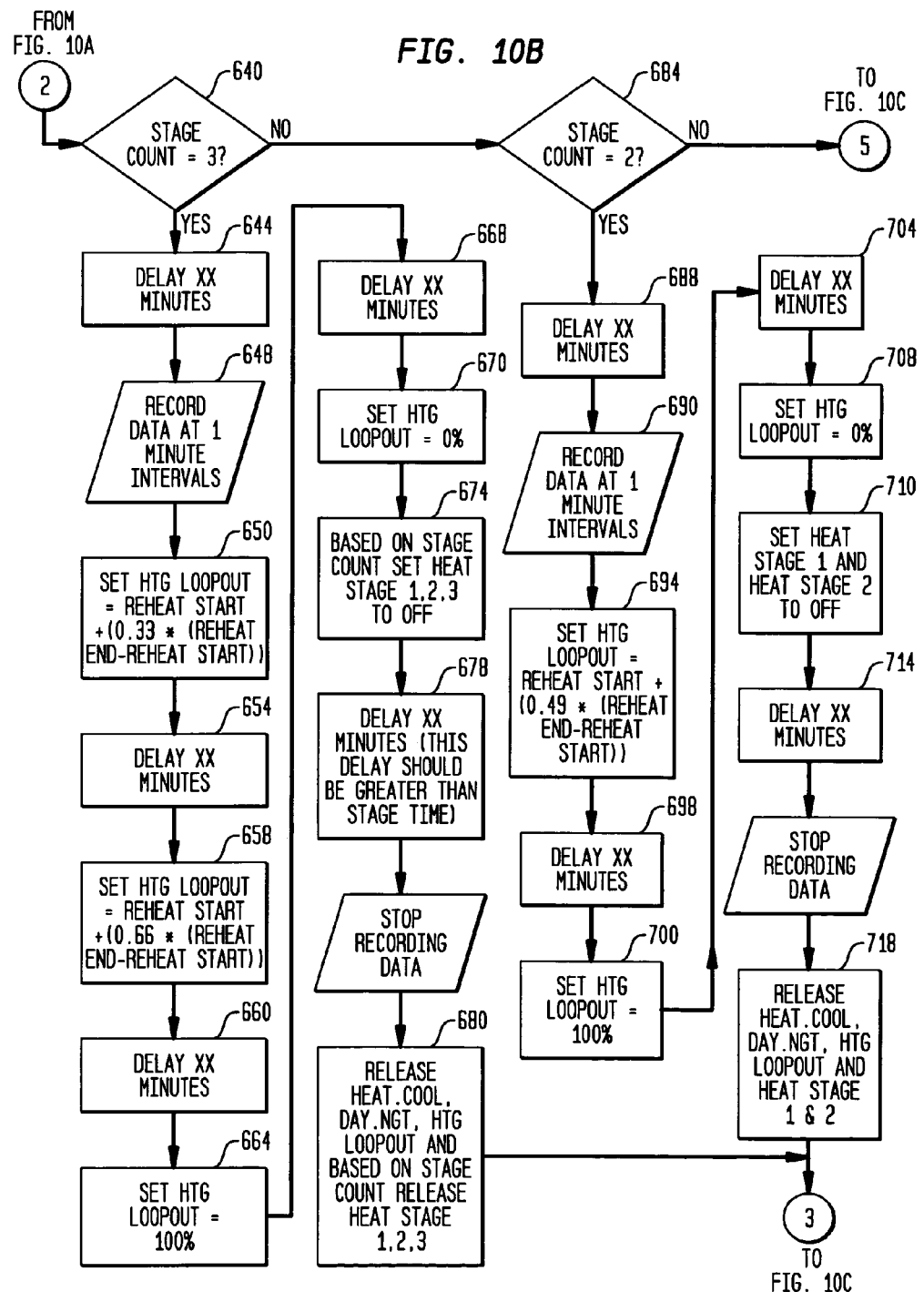

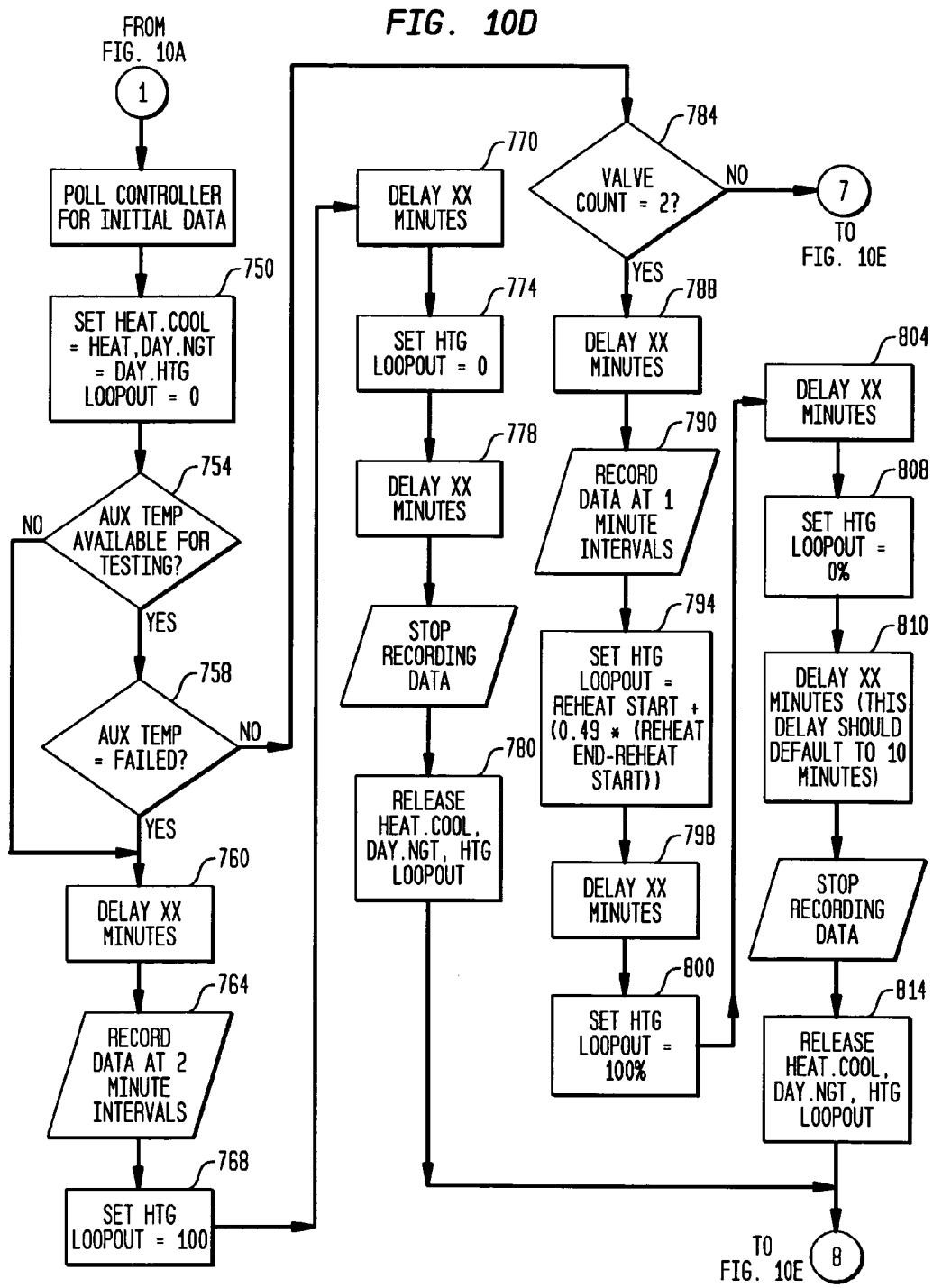

SYSTEM AND METHOD FOR DEVELOPING AND PROCESSING BUILDING SYSTEM CONTROL SOLUTIONS

This application is a utility application that claims benefit of U.S. Provisional Patent Application Ser. Nos. 60/473,453 and 60/477,093, filed May 27, 2003 and Jun. 9, 2003, respectively, and both of which are entitled "Automated Test Tool for Terminal Box Controller Installations."

FIELD OF THE INVENTION

This invention relates to control systems for building systems such as environmental systems and, more particularly, to systems and methods for testing variable air volume (VAV) box controllers in building systems.

BACKGROUND OF THE INVENTION

Most commercial properties include a number of building systems that monitor and regulate various functions of the building for the comfort and well-being of the tenants. These building systems include security systems, fire control systems, and elevator systems. One prevalent and important building system is the environmental control system.

An environmental control system is used to regulate the temperature and flow of air throughout a building. A heating, ventilating, and air conditioning (HVAC) system maintains environmental conditions within a building for the comfort of the occupants. A typical HVAC system is divided into zones and is adapted to maintain each zone within predefined environmental parameters such as humidity and temperature. The air conditioning for a building typically includes one or more chillers for cooling air and one or more heaters for warming air. An air handling unit (AHU) supplies conditioned air to ductwork that distributes the air to each of the zones. The AHU generally includes elements for introducing outdoor air into the system and for exhausting air from the system. An AHU is typically comprised of a centrifugal blower that pressurizes the conditioned air for distribution though a duct at a desired flow rate. Variable air volume (VAV) boxes are control boxes coupled to ducts to further regulate the air flowing through a zone. Air flow regulation is achieved by controlling a damper position within the box. The dampers are maneuvered through a range of movement from being 100% open to 0% open, i.e., closed, by one or more actuators. The control components of a VAV box typically store one or more set points. If multiple set points are stored, one set point may be used for when the building system is in a heating mode, while another may be used when the system is in a cooling mode. The VAV box regulates temperature within a room by opening and closing the damper to adjust the volume of conditioned air delivered to a room so the room temperature is driven towards the set point. The speed of a motor that drives the blower is controlled to regulate fan speed and, correspondingly, air flow in the system. An important component of a building environmental system is the control system that varies the fan motor speed and the position of the various dampers to maintain pressure and flow rate set points for the system.

Control systems for building systems are increasingly reliant upon computer and network technology. Microcontrollers and the like may be used to operate and maintain actuators for damper position as well as controlling fan speed. These local controllers provide operational data to an overall system controller. The overall system controller is typically a computer that analyzes data received from local controllers to determine whether system parameters, such as set points, are being maintained. If the system parameters are not being met, the system controller issues command messages to one or more building controllers to adjust local control so the system parameters may be achieved. In some previously known systems, the system controller communicates with the building controllers over a computer network. Most typically, the hardware platform for the network is an Ethernet platform and the network software supporting communication over the network is a TCP/IP layer. This structure supports communication between a control application program executing on the system controller and an application program executing on the building controller.

Most building control systems may be described as having three network levels. These levels are the management level network, the building level network, and the floor level network. The management level network may be an Ethernet network that is based on a TCP/IP protocol. This network level typically includes a report server, a building automation server, and at least one building automation client. The building automation server operates as the overall system controller as described above. This server includes a user interface to provide system information that may be understood and evaluated by a human. The management network level may also be coupled to other external networks through supervisory computers, Internet gateways, other network gateways, or network managers. These other networks may have hierarchical levels that may be able to communicate with the management network level.

The management network level in most building systems is coupled to a building level network that is comprised of at least one peer-to-peer modular building controller. The modular equipment controller is a modular, programmable primary controller with a supervisory interface capability to monitor a secondary controller network. The modular building controller monitors and regulates general HVAC applications including air-handling units, chiller/boiler/central plant control and distribution systems, data acquisition, and other multi-equipment applications. The modular building controller provides on-board control of I/O points and central monitoring for distributed secondary control units and other building systems, such as fire, security, and lighting systems. Comprehensive alarm management, historical trend collection, and operator control and monitoring functions are integral to the modular building controller. Typically, a modular building controller may have up to 96 floor level devices coupled to it.

The peer-to-peer building level network coupling the building modular controllers may be an Ethernet network, as is typical of the management level network. Thus, computers on the management level network may communicate with the controllers on the building level network. This enables further integration and evaluation of the monitoring and regulation performed by the building controllers.

Devices coupled together by the floor level network may include terminal equipment controllers, environmental condition sensors, differential pressure monitors, fume hood control monitors, lab room controllers, digital energy monitors, variable frequency drives, variable air volume (VAV) boxes, and other devices. Typically, the floor level network employs a protocol, such as the LonTalk protocol, to support communication between these types of devices and the modular building controllers of the building level network.

The topology of a building environmental system may be rather intricate and involve one or more AHUs, one or more VAV boxes, and a number of sensors for monitoring the effectiveness of the system in maintaining its programmed set points. When a building environmental system is installed in a building, it must be commissioned. Commissioning includes testing the building controllers to determine whether the AHUs and VAV boxes may be controlled to maintain the set point conditions for which the system was designed. This activity requires operating the system at certain predefined conditions and measuring the resulting environmental parameters, such as temperature or pressure. Additionally, some VAV boxes may include heating elements for supplemental heating of air passing through the box. Thus, the operation of the VAV boxes in both heating and non-heating modes needs to be verified. Consequently, commissioning requires the methodical setting of operational conditions, monitoring the operational modes of components within the control system, measuring the environmental results, and evaluating the effectiveness of the system components.

In previously known commissioning methodologies, set points were entered into a control component, the component was activated, and the data collected manually. In response to the laborious efforts require for such testing, computerized testing tools have been developed. However, these computerized tools suffer from a number of limitations. For one, VAV boxes were tested by coupling a computer tool to an individual VAV box and varying the control signal to alter the damper position within the box. The coupling of the test tool to the VAV box required the VAV box to be wired differently during testing than what it was for system operation. Additionally, sensors had to be temporarily mounted or held in proximity to the air discharge of a VAV box and coupled to the computer to obtain measurements regarding the characteristics of the air flow. The computer then analyzed the results for the VAV box to which it was connected and indicated whether that box passed or failed the test.

While this method reduces the amount of manual labor required for system commissioning over previously known systems, it still required coupling and decoupling of the computer tool to each VAV box and the sensors mounted at the box. Furthermore, each VAV box was tested independently so the system condition was static except at the VAV box being tested. Such testing fails to provide information regarding the control of floor level network components through the building level network. Furthermore, after testing, the wiring coupling the test tool had be removed so manual labor was involved in returning the VAV box to its operational setup. To properly identify all of the VAV boxes to be tested, the test personnel had to have a system diagram identifying each VAV box in the system and they had to manually track which ones had been tested and which ones remained to be tested. Similar tracking was required to definitively known whether a VAV box had been calibrated before being tested. If a VAV box was not calibrated before being tested, the time spent testing the VAV box was wasted.

In prior testing methodologies, the computer test tool collected data and either printed it out or presented it on a display. If a VAV box failed a test, the testing personnel had to determine what the cause of the failure might be. This procedure requires the testing tool operator to be knowledgeable about VAV boxes and system parameters in order to propose a possible cause for the failure. Therefore, one or more experienced technicians were required to test and troubleshoot VAV boxes. Such a procedure either adds expense for the use of multiple experienced technicians or time so a single technician can test each VAV box in a system.

What is needed is a computerized test tool that enables testing of multiple VAV boxes without requiring breakdown and setup of the test equipment between VAV box testing.

What is needed is a system that enables measurement data to be developed for system dynamics during VAV box testing.

What is needed is a VAV test tool that determines whether a VAV box has been calibrated before conducting a test of the VAV box.

What is needed is a VAV test tool that can identify the VAV boxes to be tested and track which ones have been tested.

What is needed is a VAV test tool that can test more than one VAV box without having to be coupled and decoupled to each box individually.

What is needed is a VAV test tool that can determine the cause of a test failure without requiring experienced technician intervention.

SUMMARY OF THE INVENTION

The above limitations of previously known systems and methods may be overcome by a system and method implemented in accordance with the principles of the present invention. A method for automatically testing in parallel multiple variable air volume (VAV) boxes coupled to the same floor level network comprises communicating with a floor level network from a building level network; and sending at least one test parameter to a plurality of variable air volume (VAV) boxes coupled to the floor level network so that at least two VAV boxes are responding to the one test parameter at approximately the same time. By communicating with a floor level network through a building level network, each VAV box in a floor level network may be tested without requiring coupling and decoupling of a test tool at each VAV box. The method may also include sending at least one test parameter associated with a first test procedure to a first VAV box coupled to the floor level network; and sending at least one test parameter associated with a second test procedure to a second VAV box coupled to the floor level network so that the first and second VAV boxes are responding to a test parameter associated with different test procedures at approximately the same time. In this manner, the method of the present invention is able to conduct multiple tests on multiple VAV boxes coupled to a floor network at approximately the same time.

The method may also include sending a calibration procedure parameter to a first VAV box coupled to the floor level network; and delaying before sending the calibration procedure parameter to a second VAV box coupled to the floor level network so that the first and second VAV boxes are not responding to the calibration procedure parameter at approximately the same time. Calibration requires a VAV box damper to be fully closed to calibrate the airflow transducer. If all the VAV boxes coupled to a floor level network perform calibration at approximately the same time, all of the dampers would fully close at about the same time. This could cause the air handling unit (AHU) to sense a high static pressure and shut down. Deactivation of the AHU impacts the other test procedures.

The method of the present invention also includes receiving test messages from the VAV boxes coupled to the floor level network in response to the at least one test parameter sent to the VAV boxes; and analyzing the test messages received from the VAV boxes to determine whether a VAV box passed a test. The analysis of this methodology enables testing to continue on other VAV boxes and for testing on the VAV box that failed to terminate. This enables multiple VAV boxes to be tested at approximately the same time without the failure of one VAV box terminating testing of the remaining VAV boxes coupled to the floor level network.

The method also includes determining a cause for a test failure from at least one test message received from at least one VAV box. This aspect of the testing method provides a possible cause for a test failure. Thus, an inexperienced technician may use the determination provided by this method to troubleshoot a VAV box. By pursuing the causes identified by the testing method of the present invention, a technician is able to learn about VAV boxes and building systems without requiring an experienced technician to do all of the training. The method may also include generating a warning in response to a VAV box passing a test. The warning identifies a marginal condition in the VAV box. In this manner, the method of the present invention identifies possible problems before complete failure at a VAV box occurs. This is especially important at building system commissioning so marginal performance is addressed before the building system experiences actual loads.

The method of the present invention determines which devices will be tested on a floor level network by polling a plurality of devices coupled to the floor level network and determining from an identifier in a response to the polling whether a device is a VAV box. The VAV box identifiers are stored in a VAV procedure list that is used to conduct the VAV box testing. The testing of the present invention preferably includes a calibration procedure, an auto zero module procedure, a damper operation and airflow procedure, a heating function procedure, and a control function procedure. The calibration procedure enables all of the VAV boxes coupled to a floor level network to be calibrated without impacting the AHU availability for subsequent tests. The auto zero module procedure verifies that a VAV box is able to calibrate an air velocity transducer without fully closing a damper and cutting off air flow to a room. The damper operation verifies that the VAV box set points have been set correctly and that damper operation corresponds to a reasonable set point. A heating function procedure verifies that a VAV box with air heating capability is able to properly heat air and a control function procedure verifies whether the fan control for a VAV box operates correctly.

The method of the present invention is also able to determine whether a temperature message received from a VAV box in response to a test parameter for the heating function procedure contains a room temperature or a discharge temperature. This ability enables heating control to proceed with a discharge temperature sensor or a room temperature sensor. Discharge temperature sensors enabling the heating function procedure to be perform more quickly but the cost of adding these sensors increases the cost of VAV box testing. On the other hand, if increased testing time can be tolerated, then the cost of adding the discharge temperature sensors is saved. The method of the present invention provides more flexibility to the building management.

A system for automatically testing in parallel multiple variable air volume (VAV) boxes coupled to the same floor level network comprises a building level network interface for communicating with a floor level network from a building level network; and a test manager for sending at least one test parameter to a plurality of variable air volume (VAV) boxes coupled to the floor level network so that at least two VAV boxes are responding to the one test parameter at approximately the same time. The test manager implements the method set forth in more detail above. The test manager also includes an analyzer for analyzing the test messages received from the VAV boxes to determine whether a VAV box passed a test, a warning generator for generating a warning in response to a VAV box passing a test with a marginal condition in the VAV box, and a data repository for storing at least one test parameter for a calibration procedure, an auto zero module procedure, a damper operation and airflow procedure, a heating function procedure, and a control function procedure.

The system and method of the present invention provide a computerized test tool that enables testing of multiple VAV boxes without requiring breakdown and setup of the test equipment between VAV box testing.

The system and method of the present invention provide a system that enables measurement data to be developed for system dynamics during VAV box testing.

The system and method of the present invention provide a VAV test tool that determines whether a VAV box has been calibrated before conducting a test of the VAV box.

The system and method of the present invention provide a VAV test tool that can identify the VAV boxes to be tested and track which ones have been tested.

The system and method of the present invention provide a VAV test tool that provides an analysis of the test data to facilitate troubleshooting of marginal VAV box performance or VAV box failure.

These and other advantages and features of the present invention may be discerned from reviewing the accompanying drawings and the detailed description of the invention.

BRIEF DESCRIPTION OF THE DRAWINGS

The present invention may take form in various components and arrangement of components and in various methods. The drawings are only for purposes of illustrating exemplary embodiments and alternatives and are not to be construed as limiting the invention.

FIGS. 10a, 10b, 10c, 10d, and 10e are flow diagrams for an exemplary process for a heating function procedure that may be performed by the automated test tool of FIG. 2;

DETAILED DESCRIPTION OF THE INVENTION

Figure 1:
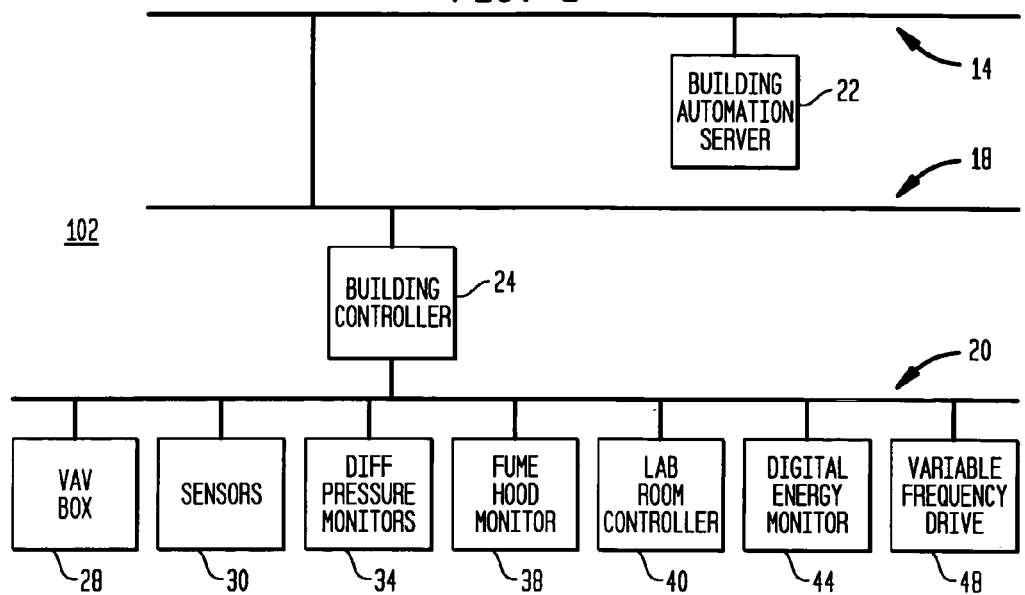
FIG. 1 is a block diagram of a building system network and components.

A three tier building system 10 in which a test tool incorporating the principles of the present invention may be used is shown in FIG. 1. System 10 includes management level network 14, a building level network 18, and a floor level network 20. Management level network 10 and building level network 18 may be Ethernet based networks through which computers coupled to the networks communicate in a TCP/IP protocol. Coupled to the management level network 14 is a building automation server 22. The server 22 provides overall control of a building control system, a portion of which, at least, is implemented with components coupled to the building level network 18 and to the floor level network 20.

At least one modular building controller 24 is coupled to the building level network 18 to monitor and regulate the operation of the components coupled to the controller 24 and the floor level network 20. Building controller 24 provides on-board control of I/O points in the devices coupled to it through the floor level network 20 and includes programs for using these data to implement HVAC, security, and/or lighting applications. The controller 24 may use the LonTalk protocol to communicate with the devices coupled to it through the floor level network 20. These devices may include terminal or VAV box controllers 28, one or more sensors 30, differential pressure monitors 34, fume hood control monitors 38, lab room controllers 40, digital energy monitors 44, variable frequency drives 48. The building controller 24 issues the commands to these devices required to implement the overall building control supervised by the building server 22. The building controller 24 also collects data from the devices on network 20 and provides it to the server 22. The controller 24 may also process this data and provide data reports to the server 22. Thus, the controller 24 is able to communicate with the server 22 over the Ethernet based network in the TCP/IP protocol and also communicate with the devices coupled to floor level network 20 in the LonTalk protocol.

Figure 2:
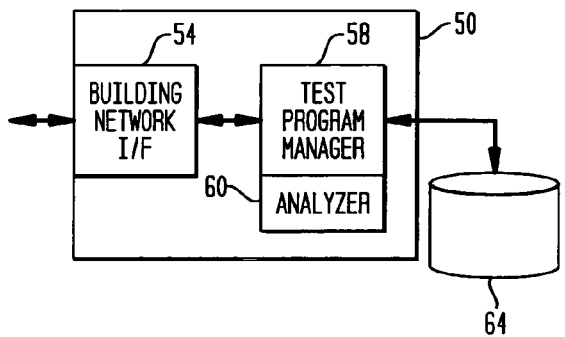
FIG. 2 is a block diagram of an automated test tool that may be used in the network of FIG. 1.

An automated test tool made in accordance with the principles of the present invention is shown in FIG. 2. The automated test tool 50 includes a building level network interface 54 and a test program manager 58. Building level network interface 54 is a communication interface that enables the test tool 50 to couple to the building level network 18 and communicate with the building controller 24. This enables the test tool 50 to pass commands to the devices coupled to the floor level network, to interrogate the devices for data, and to receive data from the devices. The test manager 58 determines the identification of the VAV boxes to be tested, selects the VAV boxes to be conducted for each test, supervises each test to be conducted, collects the data for each test, and evaluates the test results. The test manager 58 also includes an analyzer 60 to analyze the test messages received from VAV boxes in response to test parameters sent by the test manager 58 through the building level network interface 54. Test tool 50 may be implemented with a personal computer having a Pentium IV processor with 128 MB of RAM and a 20 GB hard drive. Thus, test manager 58 is able to provide a user with information regarding the progress of tests on a display and receive input for conducting tests through a keyboard, mouse, touch screen, or the like.

Figure 3:
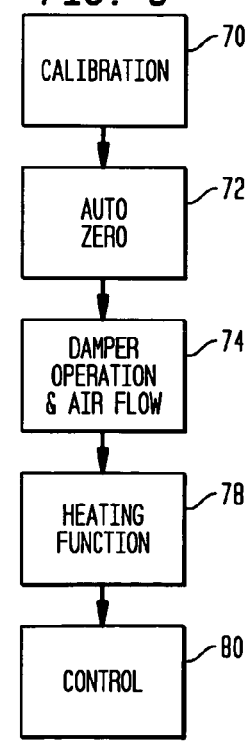
FIG. 3 is a flow diagram of an exemplary test procedure flow that may be performed by the automated test tool of FIG. 2.

As shown in FIG. 2, test manager 58 is coupled to a data repository 64. Data repository 64 contains the procedures to be administered by test manager 58 and may be used to store data collected from the tests. Preferably, test manager 58 supervises five procedures in the following order: calibration 70, auto zero 72, damper operation and airflow 74, heating function 78, and control 80 tests (FIG. 3). Before administering the procedures, test manager 58 identifies the VAV boxes to be tested. This is done, in part, to obtain the data needed by a user to determine whether a procedure should be conducted on a VAV box. For example, not all VAV boxes have a heating element so the heating function test cannot be performed on this type of box. Additionally, the same procedure may be conducted differently for different types of VAV boxes. For example, some VAV boxes use hot water to impart thermal energy to air while others use electrical elements. The heating test differs for these two different types of boxes. The heating function test may use room temperature data or discharge temperature data for evaluating VAV box performance. The user is preferably enabled to enter data identifying the type of temperature data used in the heating function procedure because the collection of discharge temperature data requires discharge temperature sensors to be mounted in the discharge duct of a VAV box. This adds expense to the building system but enables the heating function test to be performed more quickly.

Figure 4:
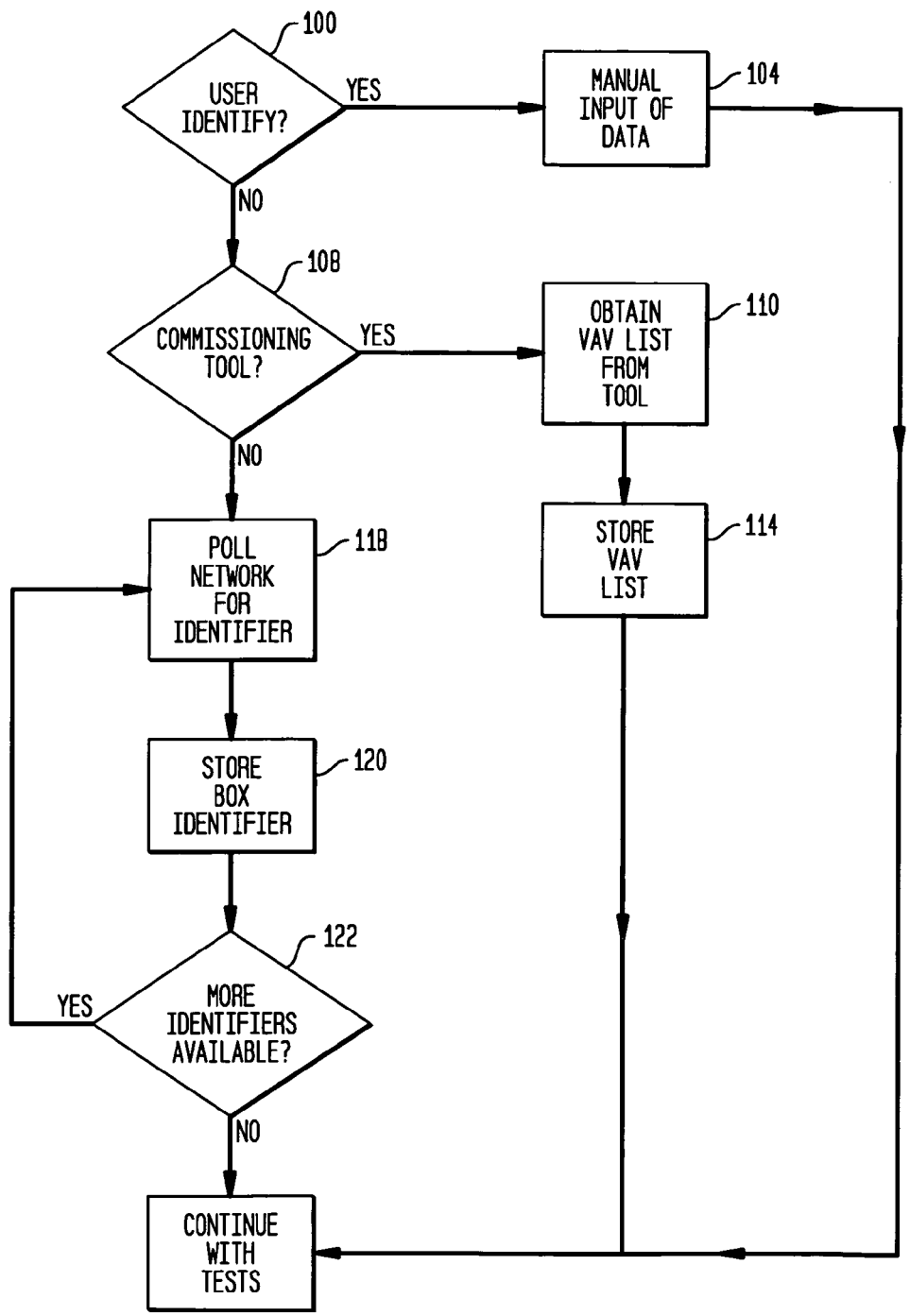
FIG. 4 is a flow diagram of an exemplary variable air volume (VAV) identification procedure that may be performed by the automated test tool of FIG. 2.

The process for identifying VAV boxes is shown in FIG. 4. The process may accept user input (block 100), if the user prefers to manually enter the identification data for the VAV boxes to be tested. This may be done in a conventional manner (block 104). If the identification data is not manually entered, then the user may direct test tool 50 to obtain the VAV box identification data from a commissioning program (block 108). A commissioning program may execute on the building automation server 22. In response to a command to obtain the data from a commissioning program, the process communicates with the commissioning program to obtain a list of VAV boxes to be tested through a building controller 24 (block 110). The list is stored in tool 50 for further reference (block 114). If the commissioning program is not selected, the floor level network 20 is polled through the building level network interface 54 (block 118) for all devices coupled to the floor level network. Test manager 58 determines which devices are to be tested and stores them in a list of VAV boxes for testing (block 120). Inclusion of a VAV box in the VAV box list corresponds to an identifier associated with the VAV box. Test manager 58 is programmed to determine which VAV boxes may be tested. The process continues until all of the VAV boxes on the floor level network have been obtained (block 122). The identification data for the VAV boxes to be tested includes, at a minimum, an alphanumeric identifier, the address of the VAV box, and the application program implemented by the VAV box. The address of a VAV box, preferably, includes the building level network address, the address of the field panel through which the VAV box may be reached, the floor level network address, and the drop number of the VAV box on the floor network. This information may be supplemented with other data as procedures are conducted so the user may exercise options during the progress of the test.

Figure 5:
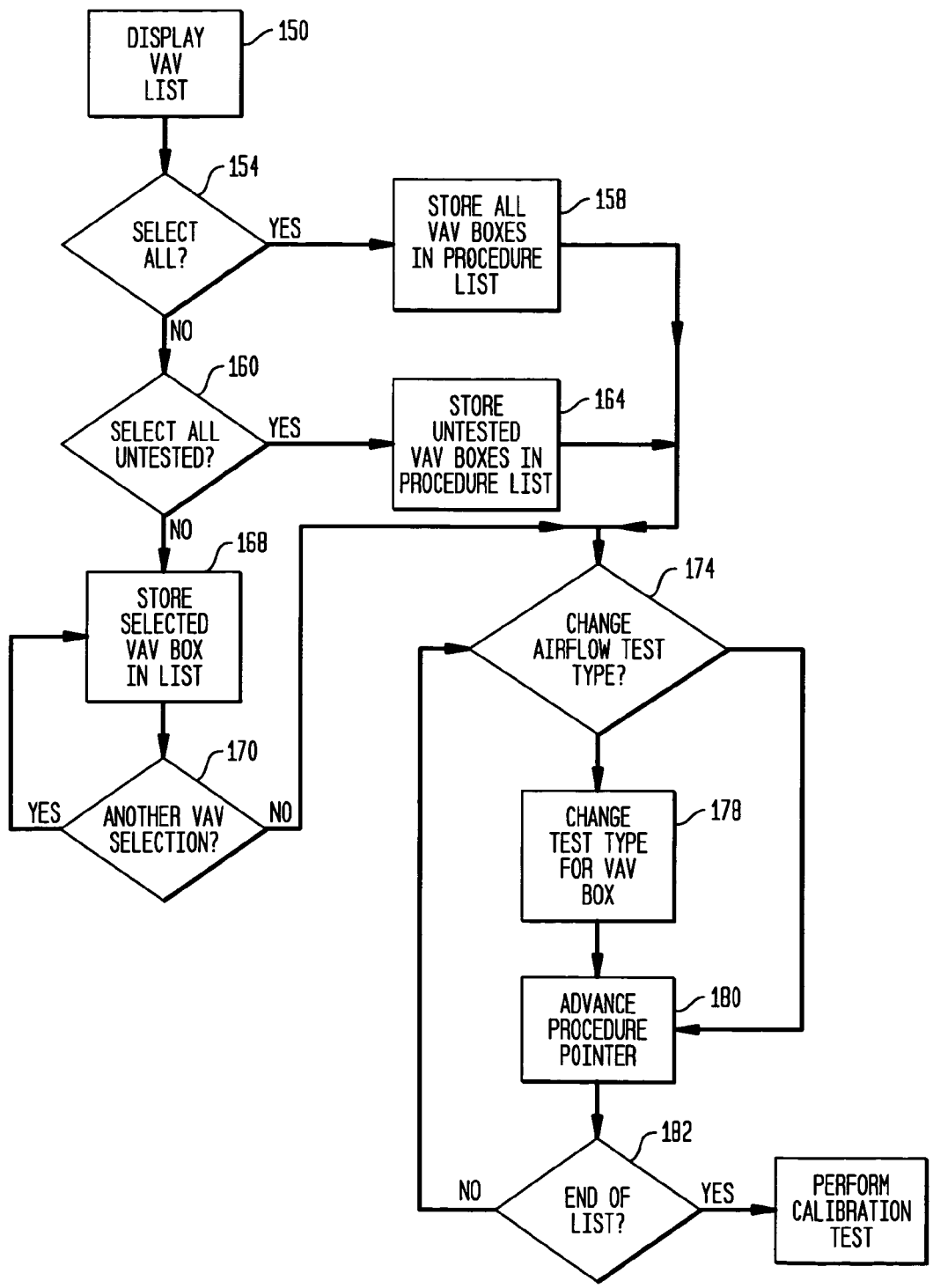
FIG. 5 is a flow diagram for an exemplary procedure for identifying user options that may be performed by the automated test tool of FIG. 2.

Before testing commences, the user may select the VAV boxes to be tested and specify the type of airflow test. The process for these user options is shown in FIG. 5. The process displays the list of VAV boxes with the identification data, the air handling unit (AHU) associated with the VAV box, its airflow test type, its heating test sensor type, its current test status (block 150). The user may enter a command to select all of the VAV boxes for testing (block 154). If the "select all" command is entered, then the VAV list is used to generate the VAV procedure list (block 158). Otherwise, the process determines whether the user entered a "select all untested" command (block 160). If it was, then the VAV boxes in the VAV list having a test status of "untested" are used to generate the VAV procedure list (block 164). Otherwise, the user selects the VAV boxes to be tested from the VAV list (block 168) and the selected VAV boxes are placed in the VAV procedure list until the user indicates no more VAV boxes are to be selected (block 170). The process determines whether the user wants to change the airflow test type for any VAV boxes in the list (block 172) and enables the user to change the test type for a VAV box in the VAV procedure list (block 174) until the list has been processed (blocks 176 and 178). Preferably, there are two airflow test types. These are "0 DMPR POS" and "100% FLOW STPT." Preferably, the default option is "0 DMPR POS" for VAV boxes with even addresses and "100% FLOW STPT" for VAV boxes with odd addresses. The option "0 DMPR POS" refers to a fully closed damper and option "100% FLOW STPT" refers to a damper opened to allow airflow equal to the maximum cooling airflow set point through the VAV box.

One advantage of a system and method implemented in accordance with the present invention is the ability to test multiple VAV boxes on a floor level network from the building level network. Another advantage is to coordinate the testing so that different tests may be performed on different VAV boxes at approximately the same time. For example, a heating function procedure performed on a VAV box having a discharge temperature sensor may be performed more quickly than a heating function procedure performed on a VAV box that uses a room temperature sensor. Consequently, the VAV box having a discharge temperature sensor may finish the heating function procedure and the test manager may initiate the next procedure for that VAV box, control function, for example, before the VAV box using a room temperature sensor completes the heating function procedure. Thus, the test manager 58 is able to process test response messages for different procedures being performed at multiple VAV boxes and track the progress of procedures at multiple VAV boxes at approximately the same time.

Figure 6:
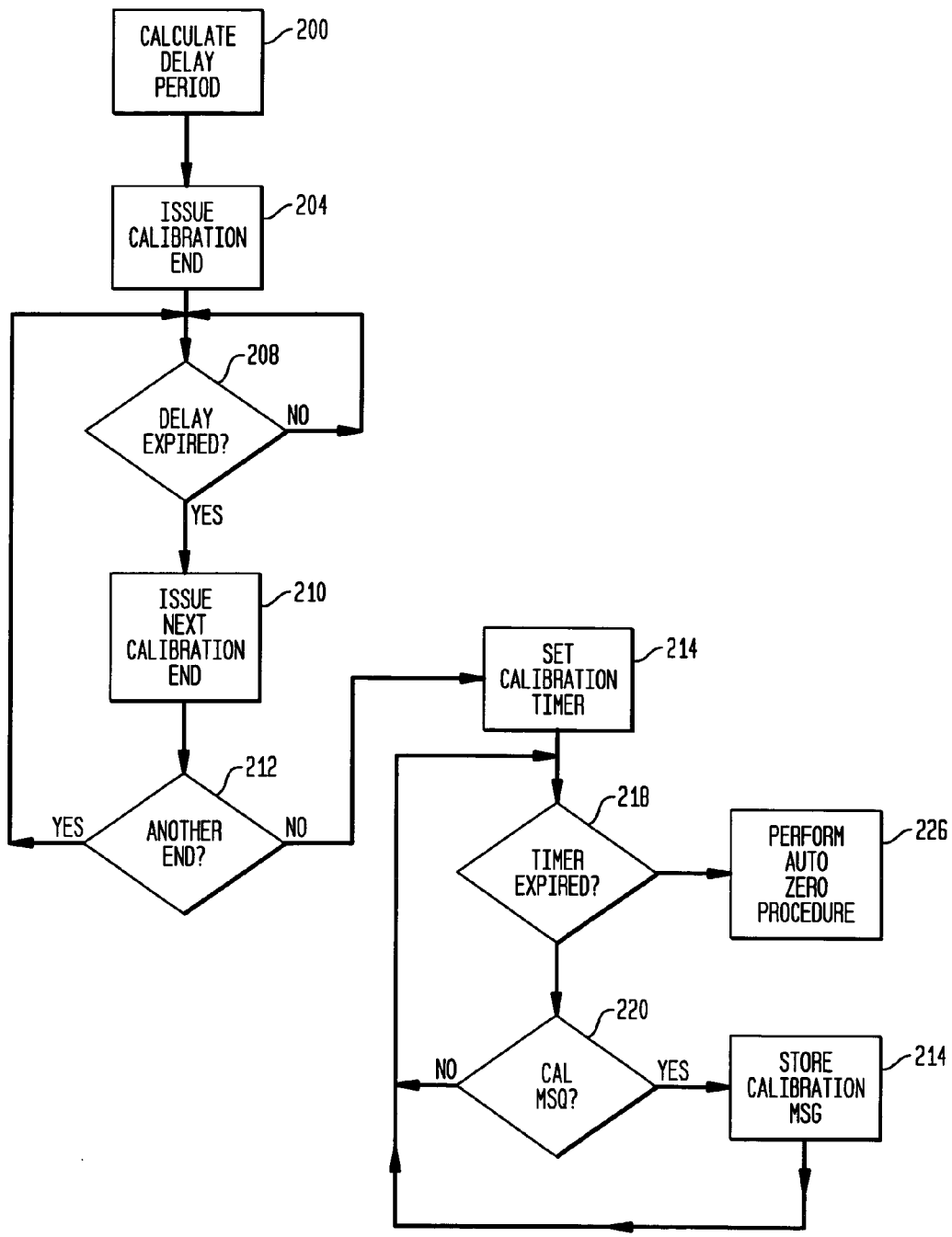
FIG. 6 is a flow diagram for an exemplary calibration procedure that may be performed by the automated test tool of FIG. 2.

The first procedure performed is calibration and an example of this procedure is shown in FIG. 6. A VAV box performs calibration in response to receipt of a CALIBRATION command from test manager 58. So all of the VAV boxes to be tested do not attempt calibration at the same time, a delay period is used to stagger the sending of a test parameter to initiate calibration at the VAV boxes. One way to determine delay periods VAV box calibration initiation is to use its address. Specifically, the address of each VAV box may be divided by 4 and the remainder is used to define a delay time that may be measured in minutes. After a delay period is calculated for each VAV box in the VAV procedure list (block 200), a CALIBRATION command is issued to all VAV boxes for which no delay period has been calculated (block 204). A delay period increment is timed (block 208) and when it expires, a CALIBRATION command is issued to all VAV boxes for which the delay period is 1 delay period increment (block 210). This process continues until all of the VAV boxes in the VAV procedure list have been sent a CALIBRATION command (block 212). A calibration timer is set (block 214) and the process continues to monitor for a CALIBRATION STATUS message from each commanded VAV box (block 220) until the calibration timer expires (block 218). The test status for each commanded VAV boxes is updated from the CALIBRATION STATUS message received from the VAV boxes (block 224). For any VAV boxes not returning a CALIBRATION COMPLETE message, the test status is updated to FAILED. Otherwise, the test status is updated to PASSED and the process commences the auto zero module procedure (block 226).

Figure 7:
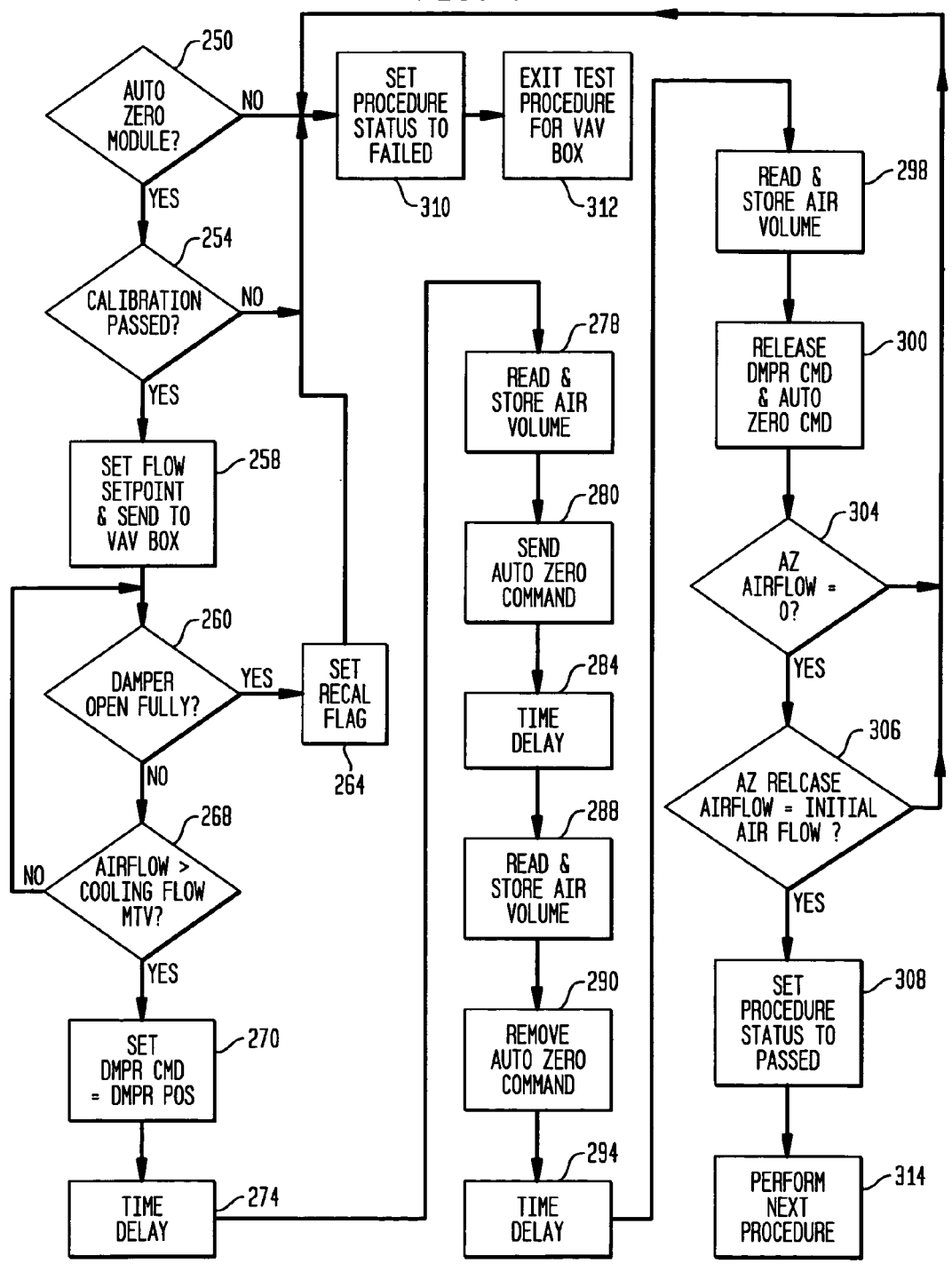
FIG. 7 is a flow diagram for an exemplary auto zero module procedure that may be performed by the automated test tool of FIG. 2.

The test manager 58 performs the auto zero module procedure following completion of the calibration procedure for a VAV box. An auto zero module enables an airflow transducer in a VAV box to be calibrated without fully closing the damper in the VAV box. Only those VAV boxes having an identifier that indicates the VAV box includes an auto zero module are subjected to the auto zero module procedure. The process for performing the auto zero module procedure is shown in FIG. 7. The process begins by determining whether the VAV box has an auto zero module (block 250). If it does not, the auto zero module test is not performed on that VAV box (block 314). Likewise, if the VAV box failed calibration (block 254), then the auto zero module procedure is not performed on it (block 314). If the VAV box has an auto zero module that has been setup and has passed calibration, a flow set point is set and sent to the VAV box (block 258). Preferably, the set point is set to a flow rate or pressure that is slightly greater than the minimum flow rate or pressure when the VAV box is in the cooling mode. The damper position of the VAV box is monitored to see if it goes to fully open (block 260). If it does, then a recalibration flag is set because the damper should not need to be fully open for a minimum air flow (block 264). Once the air flow is approximately the minimum cooling air flow rate (block 268), the damper position is received from the VAV box and used to generate a damper command for the VAV box (block 270). After a short delay (block 274), the air volume is collected and stored (block 278). This air volume should represent a steady state at approximately the low end of the air flow rate of the VAV box. A command is issued to the auto zero module that enables the airflow transducer to be calibrated without causing the damper to close (block 280) and another delay is timed (block 284). Another air volume measurement is then obtained from the VAV box (block 288). A command to remove the command to the auto zero module is sent (block 290) and another delay is timed (block 294). Another air flow measurement is taken (block 298). A RELEASE DAMPER command and RELEASE AUTO ZERO command are issued (block 300). If the air flow measurement following the AUTO ZERO command is approximately zero (block 304) and the air flow measurement following the RELEASE AUTO ZERO is approximately equal to the first air flow measurement (block 306), then the VAV box has passed the procedure and the status is so updated (block 308). If any of those conditions are not met, then the VAV box failed the test (block 310). If the VAV box fails the procedure, all processing for the VAV box stops with the auto zero module test procedure (block 312). If the VAV box passes the procedure, the auto zero module procedure is exited (block 314) so other procedures may be performed. The auto zero module process is performed on multiple VAV boxes until all of the VAV boxes in the VAV procedure list having an auto zero module have been tested.

The test manager 58 performs the damper operation and airflow procedure following the auto zero module procedure. The damper operation and airflow procedure is preferably conducted in the day mode operation with the VAV box set to cooling. Two versions of this procedure are preferred. One commands an initial closed damper position and the air flow through the VAV box is measured. Thereafter, the damper position is commanded to open incrementally and the position status is monitored until the commanded position is reached. Then the air flow is measured. This incremental opening of the damper and measurement of the air flow through the box continues until either the maximum air flow rate is reached or the damper is completely open. The second version of the procedure is called the flow set point procedure. That procedure sets the flow set point for the VAV box to 100%. Once the air flow reaches the cooling flow maximum, the damper position is commanded to be at the position that is 5% greater than its position when the cooling flow maximum was reached. The air flow is measured and then the flow set point is released. Thereafter, the damper position is decremented and air flow measured at successive intervals until the damper position is closed. Preferably, the default conditions for the damper operation and air flow procedure cause the test manager 58 to perform the first version of the procedure for VAV boxes having an even address and the second version of the procedure for VAV boxes having an odd address. As discussed above, this default assignment may be altered by the user prior to initiation of VAV box testing.

Figure 8A:
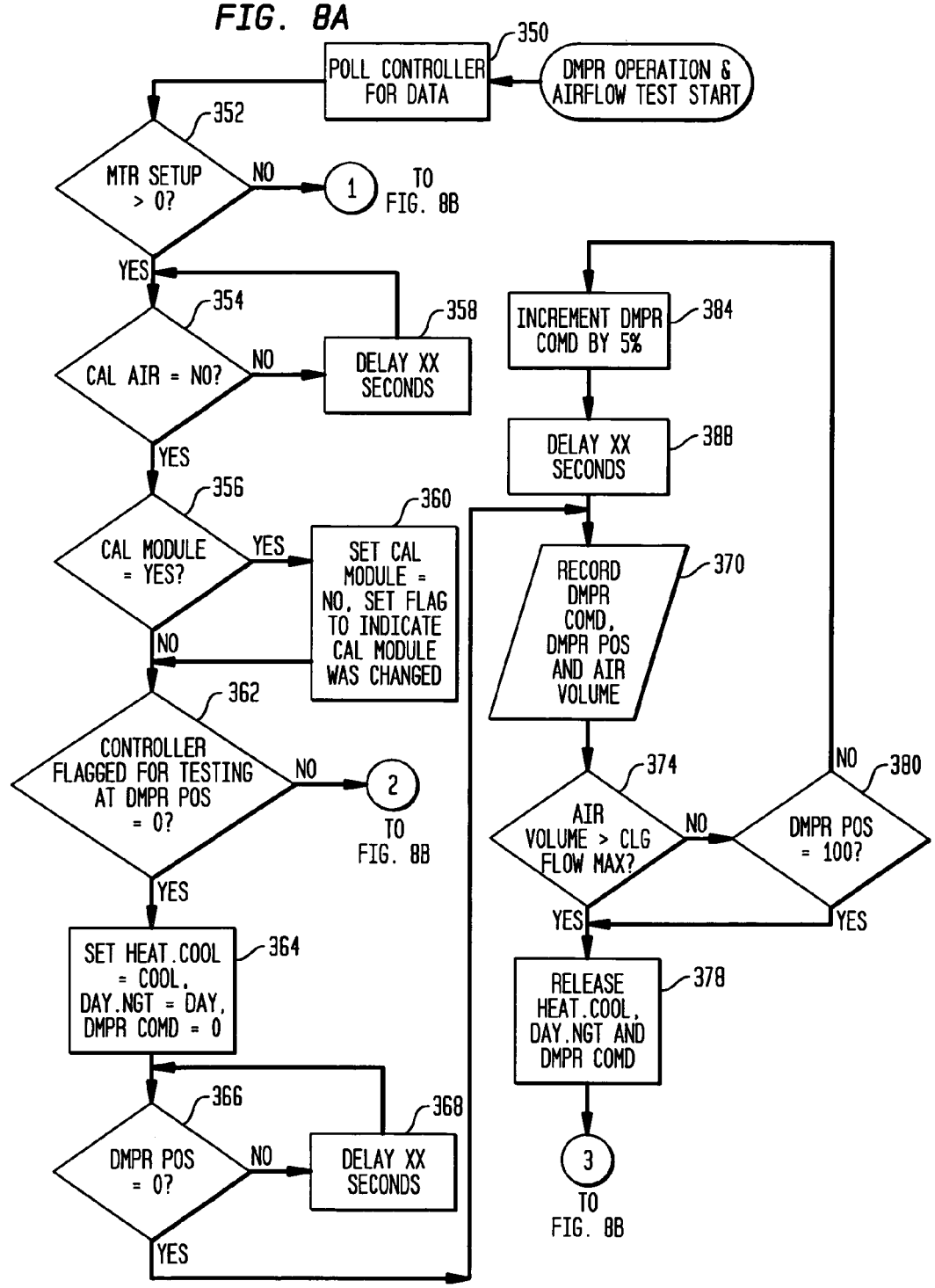
FIGS. 8a and 8b are flow diagrams for an exemplary damper operation and airflow procedure that may be performed by the automated test tool of FIG. 2.
Figure 8B:
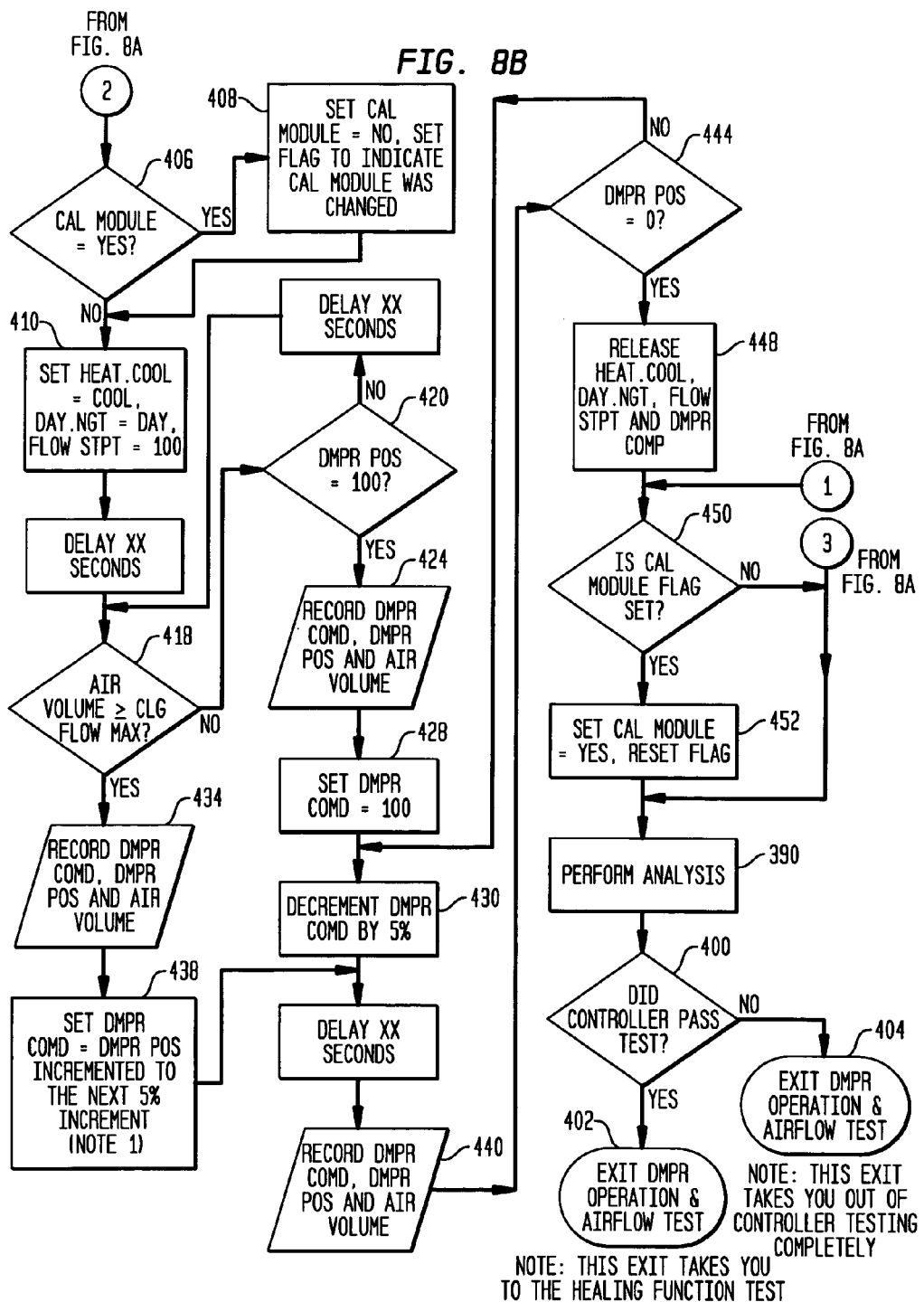

The process for the damper operation and air flow procedure is shown in more detail in FIGS. 8a and 8b. The process begins by retrieving data from the VAV box (block 350) and determining whether the VAV box has been set up to control its damper (block 352). If it has not been set up, the CAL MODULE point is set to YES (blocks 450 and 452) and the analyzer 60 evaluates and stores the test analysis (block 390). If the motor is set up and the VAV box been subject to the calibration procedure (block 354) and passed (block 356), the process sets the calibration flag so a forced recalibration does not occur during the test procedure (block 360). If the calibration procedure was not executed for the VAV box, a delay is timed to permit the calibration procedure to complete (block 358). The process then determines which procedure version is applied to a VAV box (block 362). If the first version is identified for the box, the day mode and cooling mode are set active for the VAV box (block 364). The damper is also commanded closed (block 364) and the process waits until the commanded damper position is verified (blocks 366 and 368). The air flow is measured and the air flow measurement is stored with the damper command, damper position, and air flow measurement (block 370). The process determines whether the measured air flow is greater than the cooling air flow maximum (block 374). If it is, then the procedure is concluded by releasing the day mode, cooling mode, and damper position (block 378). Otherwise, the process determines whether the damper position indicates the damper is fully open (block 380). If it is, the procedure is concluded (block 378). Otherwise, the damper command is incrementally increased (block 384). Preferably, the increment is a five percent increment so that the new damper command is the previous damper command plus five percent. For example, if the previous damper command was 30% of fully open then the next damper command is 35% of fully open. The process waits until the damper position reaches the commanded position (block 388) and then the process continues by measuring and storing the air flow (block 370). The process continues until the procedure is complete for the VAV box under test. The collected data for the VAV box under test are then analyzed and the results stored (block 390). If the VAV box passed (block 400), the next test procedure is performed (block 402). Otherwise, the testing for the VAV box is finished (block 404).

If the VAV procedure list indicates that the second version of the procedure is to be performed, then the calibration flag is set to prevent forced recalibration during testing (block 406 and 408). The cooling mode and day mode are set and the flow set point is set to 100% (block 410). The measured air flow is monitored until it is equal to or greater than the maximum cooling air flow (block 418) or until the damper position is fully open (block 420). If the damper position reaches a fully open position without the maximum cooling air flow being achieved, then the damper command, damper position, and air flow are stored (block 424). The damper is commanded to be fully open (block 428) and when that commanded position is reached, the damper command is decreased by five percentage points (block 430). On the other hand, if the maximum cooling air flow was reached without a fully open damper, then the damper command, damper position, and air flow are stored (block 434) and the damper is commanded to open to the present damper position increased by 5 percentage points (block 438). Once the damper position has stabilized to the commanded position, the damper command, damper position, and air flow rate are stored (block 440). The process determines whether the damper is fully closed (block 444). If it is not fully closed, the damper command is decreased by five percentage points (430) and the damper command, damper position, and measured air flow are stored after the damper position has stabilized (block 440). When the damper is fully closed, the cooling mode, day mode, and damper command are released (block 448). The collected data for the VAV box under test are then analyzed and stored (block 390) If the VAV box passed (block 400), testing of the VAV box continues (block 402). Otherwise, testing for the VAV box is finished (block 404).

One important aspect of a system and method of the present invention is the ability to determine whether a VAV box has passed or failed a testing procedure. Heretofore, VAV box testing tools collect data but they do not compare the data to pass/fail criteria to determine a test status for a VAV box. Instead, the test technician was required to analyze the collected data without computer assistance. In the present invention, the collected data is subjected to pass/fail criteria to assist in a determination not only of the status of the VAV box but of the source of the failure.

Figure 9A:
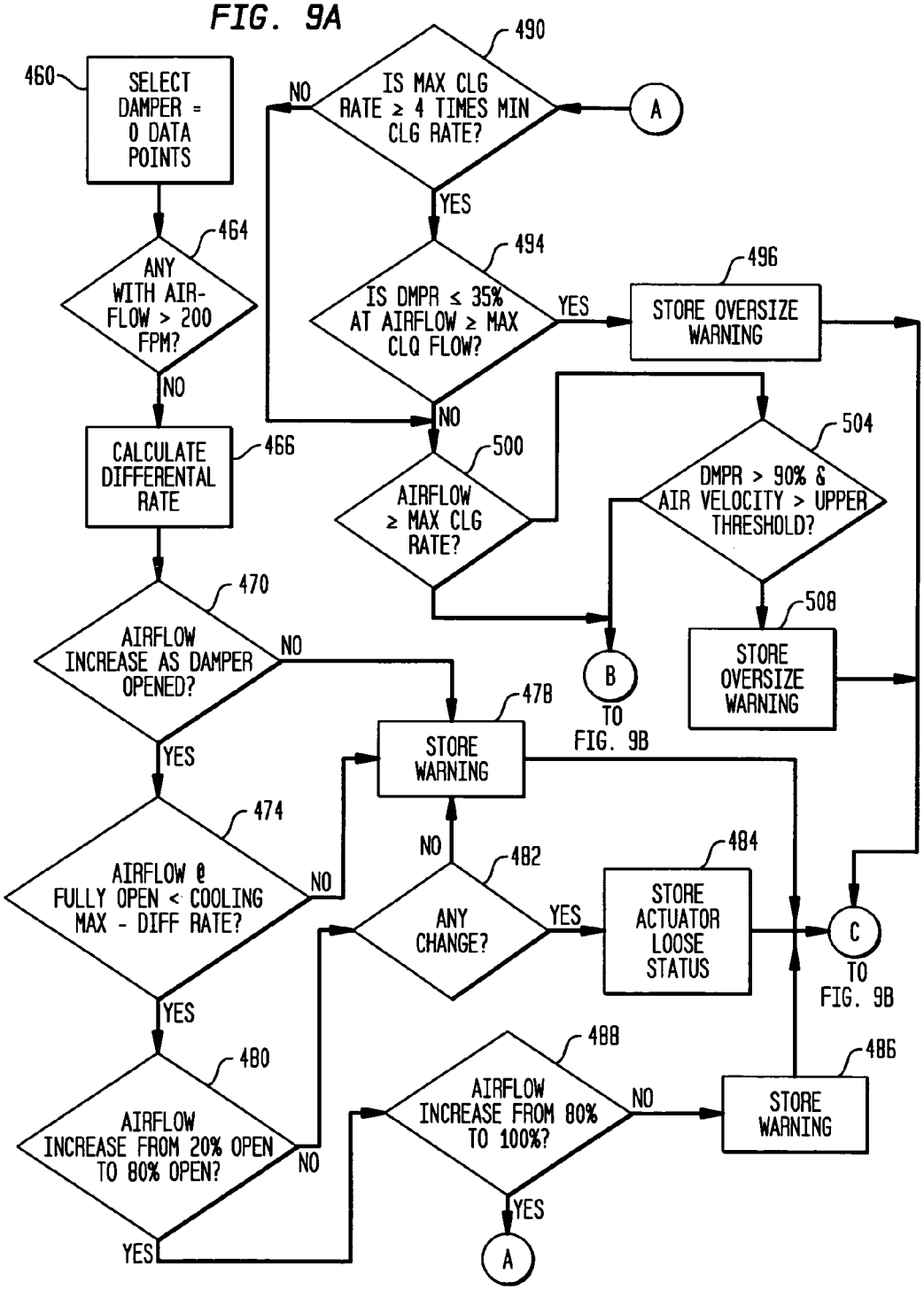
FIGS. 9a and 9b are flow diagrams for an exemplary process for evaluating collected data for a damper operation and air flow procedure that may be performed by the automated test tool of FIG. 2.
Figure 9B:
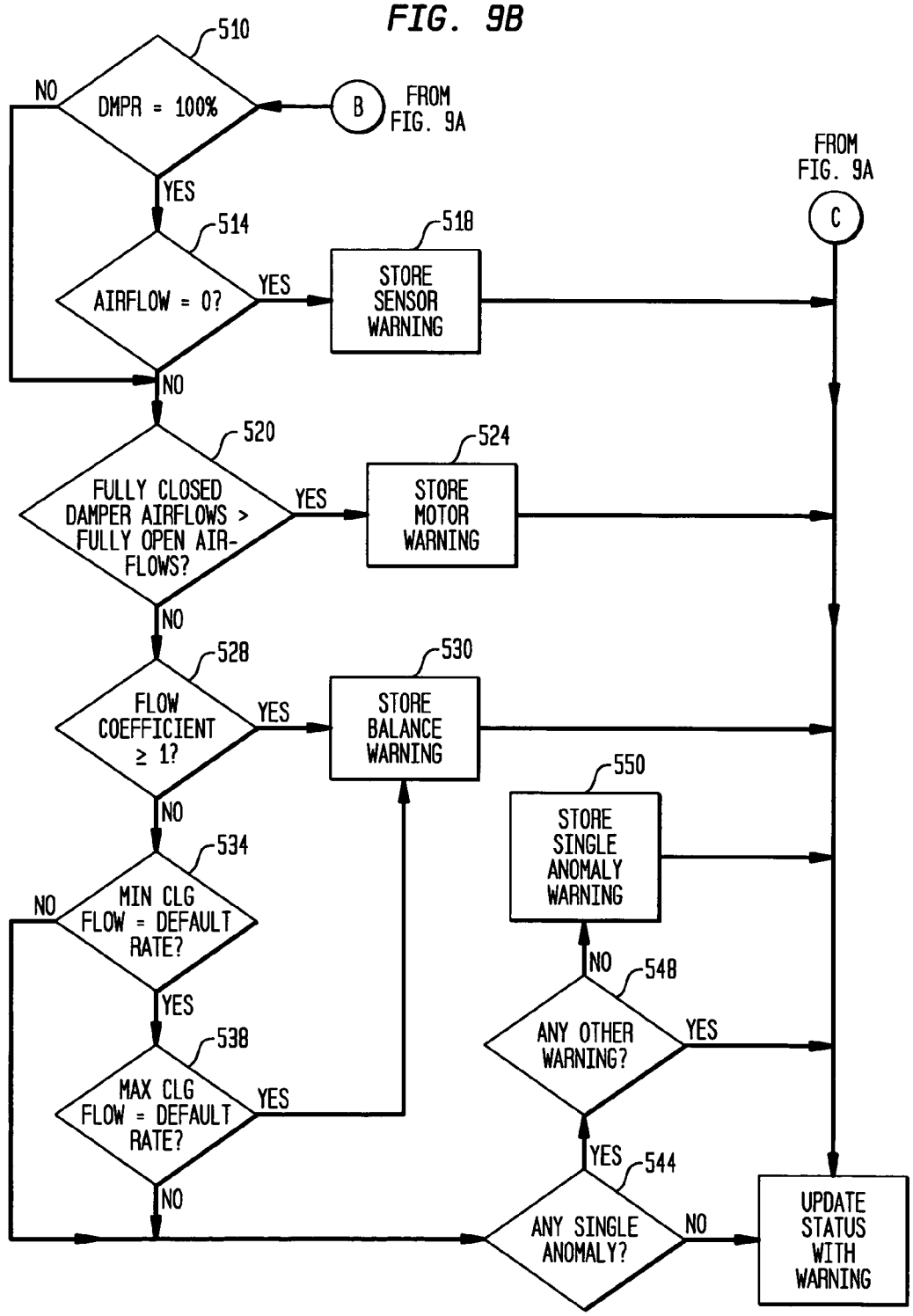

An exemplary process for evaluating collected data for a damper operation and air flow procedure is shown in FIGS. 9a and 9b. This exemplary process may be performed as the data analysis set forth in the processing block 390 of FIG. 7. The process selects all data points having a damper position of zero (block 460). If any of these data points have an associated measured air flow that exceeds 200 feet per minute (FPM) then the VAV box fails as no fully closed damper should enable an air flow exceeding that rate (block 464). The measured air flow for a VAV box at a damper 20% open is subtracted from the measured air flow when the damper is fully open to determine a differential rate (block 466). The process then determines whether measured air flow increased as the damper position incremented from 20% open to 100% open (block 470). The measured air flow when the damper is fully open is then compared to the maximum cooling air flow less the differential rate (block 474). If the measured air flow is less, then the VAV box is not getting enough air and a warning is stored for the data analysis (block 478). Otherwise, the analysis continues by determining whether the air flow increased as the damper position was incremented from 20% open to 80% open (block 480). If it did not change (block 482), the process determines the actuator is loose (block 484). If it does change but not positively throughout the range, the VAV box is not getting enough air and a warning is stored (block 478). If it is, but the measured air flow does not increase from the damper being 80% open to 100% open (block 484), then the VAV box is not getting enough air and a warning is stored (block 486). The process also determines whether the cooling maximum flow rate is greater than or equal to four times the cooling minimum flow rate (block 490). If it is, the process determines whether the damper position is equal to or less than 35% open when the measured air flow is greater than or equal to cooling flow maximum (block 494). If it is, then a warning is issued that the VAV box under test may be oversized and control may be unstable at low load conditions (block 496).

The process in FIGS. 9a and 9b also determines if, at data points where the measured air flow is equal to or greater than the cooling flow rate maximum (block 500), the damper position is greater than 90% and the air velocity is greater than an upper limit velocity threshold (block 504), then a warning is stored that the box is undersized (block 508). Preferably, the upper limit velocity is related to the flow coefficient for the VAV box under test. Most preferably, the flow coefficient is multiplied by 4092 and that product is divided by 0.85. These numbers are merely exemplary. Ninety percent of the final quotient is most preferably equated to the upper limit velocity, although other upper limit velocities may also be effective. The process continues by determining whether the measured air flow is zero for the data points having a damper position of 100% open (blocks 510 and 514). If so, a warning is stored that the flow sensor is defective (block 518). The process determines whether the measured air flows at data points having a fully closed damper position are greater than the measured air flows at data points having a fully open damper position (block 520). If they are, a warning is stored that the motor wiring or motor setup is reversed in the VAV box under test (block 524). The process also determines whether the flow coefficient for the VAV under test is equal to or greater than 1 (block 528). If it is, then a warning is stored that the setup data for the VAV box is probably inaccurate or the VAV box has not been balanced (block 530). The cooling minimum flow rate is compared to the cooling minimum flow rate default (block 534) and the cooling maximum flow rate is compared to the cooling maximum flow rate default (block 538). If both are equal to the default values, then a warning is generated that the box setup data are probably not accurate or that the box has not been balanced (block 530). Preferably, the minimum flow rate is set to a value of approximately 220 FPM and the maximum flow rate is set to a value of approximately 2200 FPM, although other values may also be effective. The preferred minimum and maximum default flow rates are chosen to have a ratio that would probably be difficult for a VAV box to achieve, such as 10:1. Also, all measured air flows are compared to a maximum velocity to determine whether any single anomaly occurred (block 544). If no other warning or failure status values have been stored (block 548), then a warning is stored that the VAV box appears to be working but that a single anomaly did occur (block 550). The stored warnings are included with the procedure status that is stored for the VAV box under test (block 400, FIG. 8).

After the damper operation and air flow procedure has been performed, the test manager 58 initiates the heating function procedure. The heating function procedure may only be performed on VAV boxes having heating capability. Thus, the process shown in FIG. 10 begins by determining whether a VAV box in the VAV procedure list has heating capability (block 600). If it does not, the procedure for that VAV box ends. The version of the heating function procedure performed depends upon whether the VAV box heats with hot water or electrical element. If the VAV box has an electrical heater (block 604), then the VAV box is set to the heating mode, day operational mode, and the heating loopout is reset (block 608). The process also determines whether an auxiliary temperature sensor is available for measuring the temperature in the discharge air of the VAV box (block 610). If an auxiliary temperature sensor is not available or is inoperative (block 612), then the process delays for the room temperature to stabilize (block 614). The room temperature is measured (block 618) and the heating loopout is set to 100% (block 620). After a delay to allow temperature stabilization (block 624), the heating loopout is set to 0% (block 628). Then each heating stage of the VAV box is set off (block 630). During a delay period, room temperature is measured and stored (block 634). Upon expiration of the delay period, the heating mode, day operational mode, loopout, and each heating stage are released (block 638). The data are then analyzed and the results stored (block 748, FIG. 10c). If the test failed, no further test procedures are performed on the VAV box by test manager 58. If the test is passed, test manager 58 submits the VAV box to further test procedures.

Figure 10A:
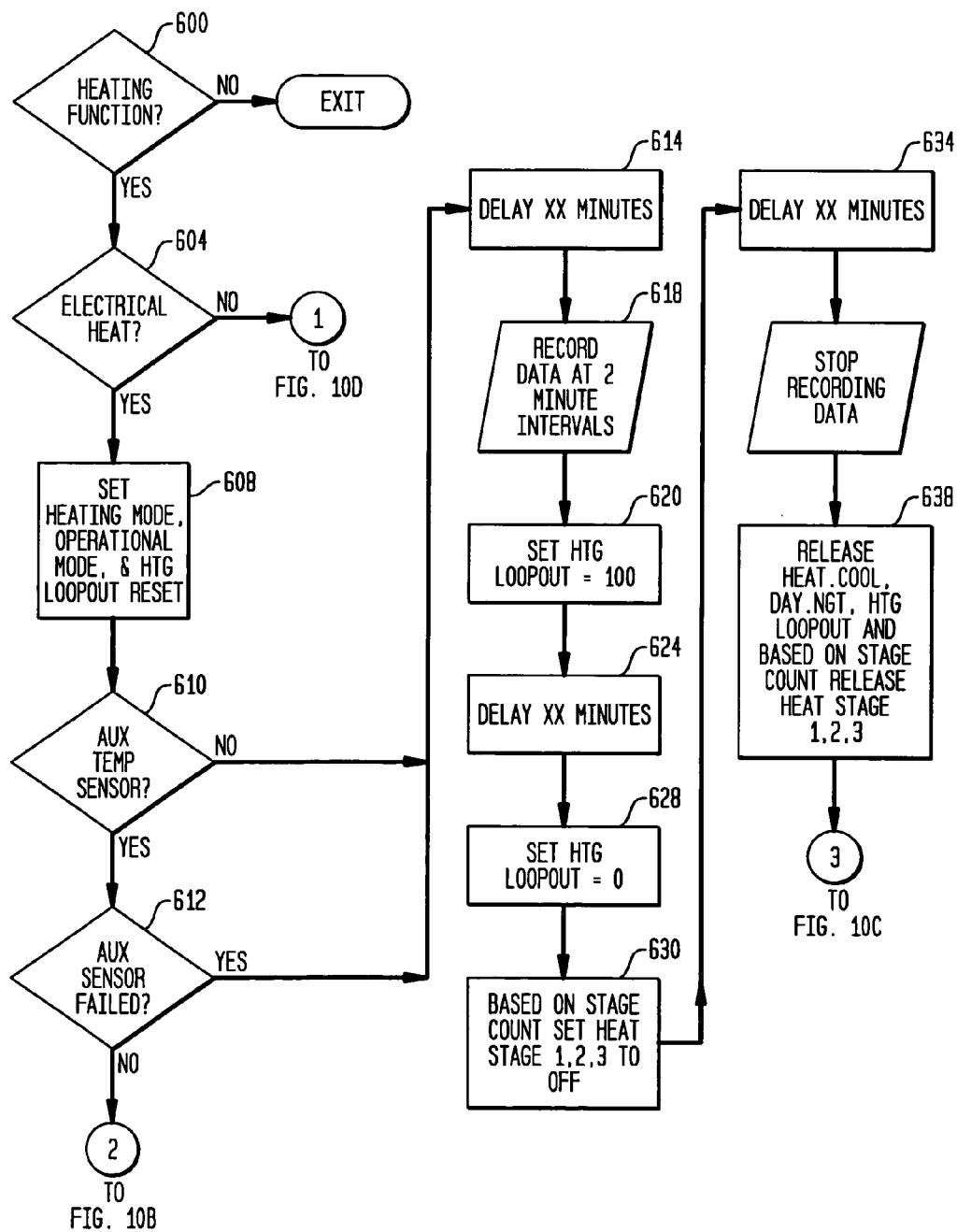
Figure 10C:
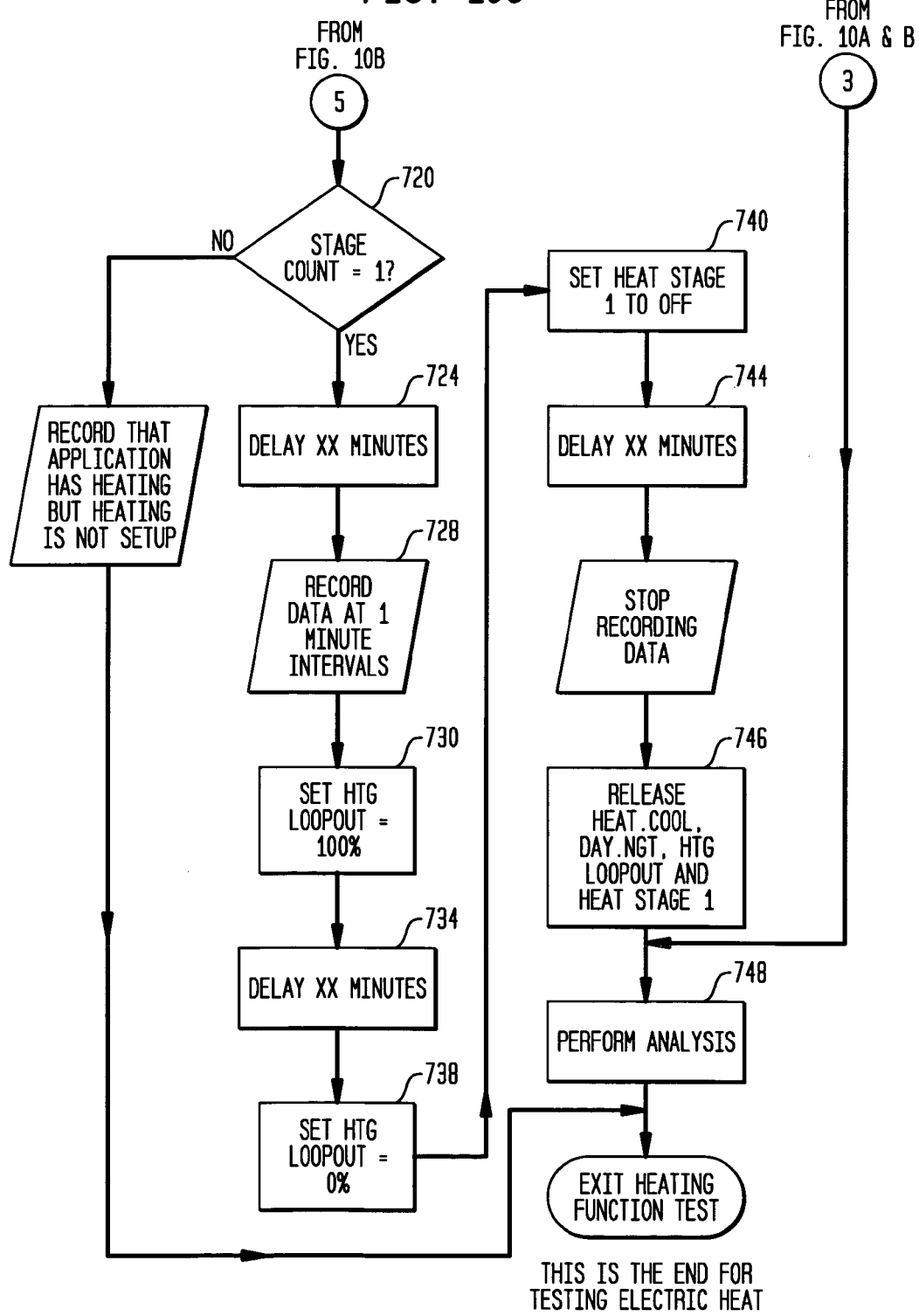
Figure 10E:
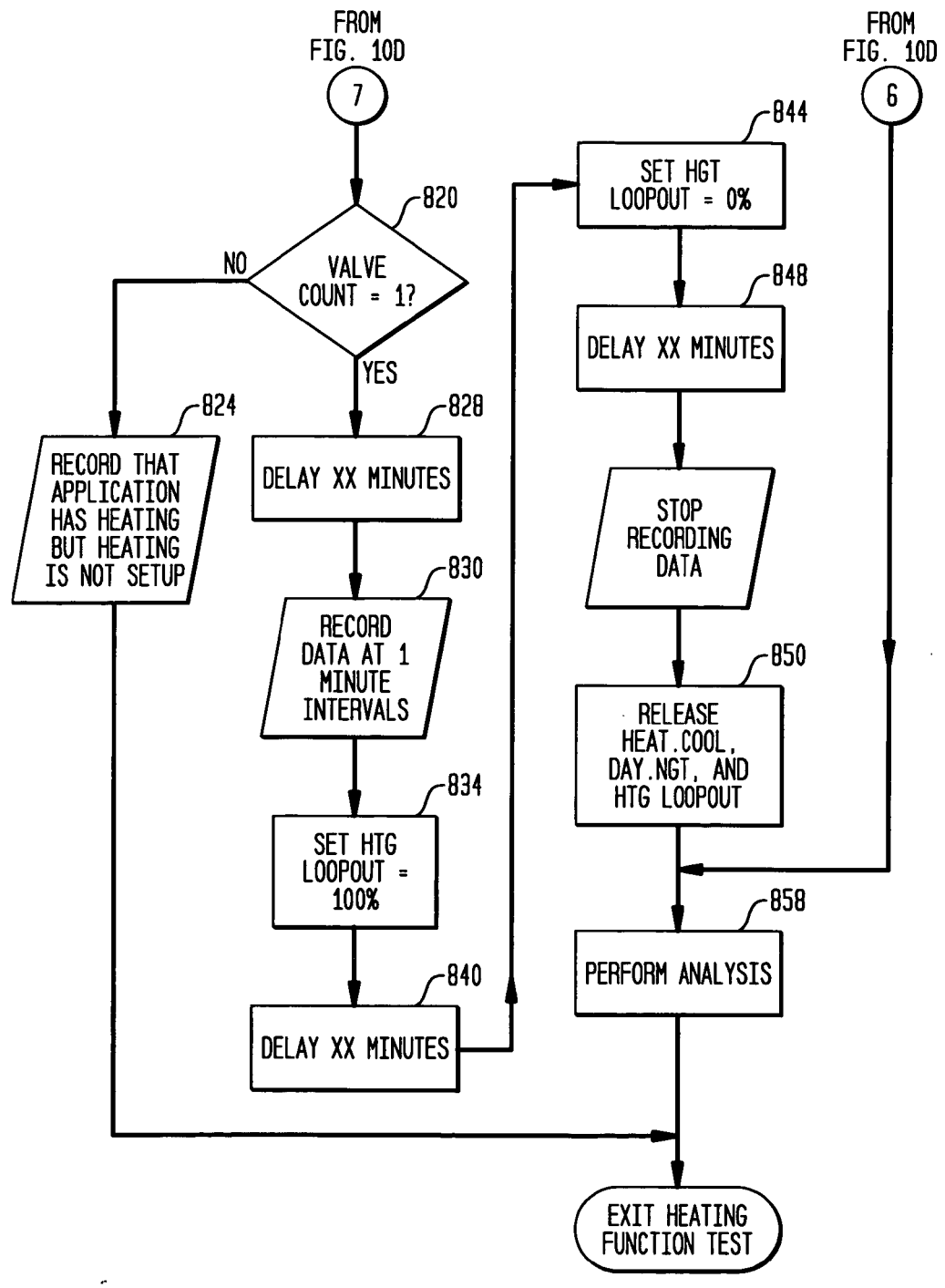

If the VAV box has electrical heating and the auxiliary temperature sensor is operational, the process determines whether the VAV box has three stage heat (block 640, FIG. 10b). If it does, the process delays so the temperature may stabilize (block 644) and the discharge temperature sampling rate is set to one minute (block 648). The heating loopout is set to a first stage level (block 650) and a delay period is timed so the discharge air temperature may be measured and stored (block 654). The heating loopout is then set to a second stage level (block 658) and a delay period is timed so the discharge air temperature may be measured and stored (block 660). Preferably, the first stage and the second stage levels are one-third and two-thirds of 100%, although other levels may be used. The heating loopout is then set to 100% (block 664) and a delay period is timed so the discharge air temperature may be measured and stored (block 668). The heating loopout is then set to 0% (block 670) and all three stages are turned off (block 674). During a delay period, discharge air temperature data are collected (block 678) and then the heating mode, day operational mode, and heating loopout, and heating stages are released (block 680). The data are then analyzed and the results stored (block 748, FIG. 10c). If the test failed, no further test procedures are performed on the VAV box by test manager 58. If the test is passed, test manager 58 submits the VAV box to further test procedures.

If the VAV box is a two stage electrical heating VAV box (block 684, FIG. 10b), the process delays so the temperature may stabilize (block 688) and the discharge temperature sampling rate is set to one minute (block 690). The heating loopout is set to a first stage level (block 694) and a delay period is timed so the discharge air temperature may be measured and stored (block 698). Preferably, the first stage level is one-half of 100%, although other first stage levels may be used. The heating loopout is then set to 100% (block 700) and a delay period is timed so the discharge air temperature may be measured and stored (block 704). The heating loopout is then set to 0% (block 708) and both heating stages are turned off (block 710). During a delay period, discharge air temperature data are collected (block 714) and then the heating mode, day operational mode, and heating loopout, and heating stages are released (block 718). The data are then analyzed and the results stored (block 748, FIG. 10*c*). If the test failed, no further test procedures are performed on the VAV box by test manager 58. If the test is passed, test manager 58 submits the VAV box to further test procedures.

If the VAV box has a single stage electrical heater (block 720, FIG. 10*c*), the process delays so the temperature may stabilize (block 724) and the discharge temperature sampling rate is set to one minute (block 728). The heating loopout is set to 100% (block 730) and a delay period is timed so the discharge air temperature may be measured and stored (block 734). The heating loopout is then set to 0% (block 738) and the heating stage is turned off (block 740). A delay period is timed so the discharge air temperature may be measured and stored (block 744). The heating mode, day operational mode, and heating loopout, and heating stages are released (block 746) and the data are analyzed and the results stored (block 748). If the test failed, then no further test procedures are performed on the VAV box by test manager 58. If the test is passed, test manager 58 submits the VAV box to further test procedures.

If the VAV box has hot water heat, the heating mode is turned on, the day operational mode is activated, and the heating loopout is set to 0% (block 750, FIG. 10*d*). The process then determines whether an operational auxiliary temperature sensor is available in the discharge area (blocks 754 and 758). If no auxiliary temperature sensor is available or operational, a delay is timed to allow temperature stabilization (block 760) and the sampling rate is set for two minutes (block 764). The heating loopout is also set for 100% (block 768) and another delay period is timed so room temperature data may be collected (block 770). The heating loopout is set to 0% (block 774) and, after a delay period (block 778), the heating mode, day operational mode, and heating loopout are released (block 780). The data are then analyzed and the results are stored (block 858, FIG. 10*e*). If the test failed, no further test procedures are performed on the VAV box by test manager 58. If the test is passed, test manager 58 submits the VAV box to further test procedures.

If the VAV box has hot water heating and an auxiliary temperature sensor, the process determines whether it has two valves (block 784, FIG. 10*d*). If it does, a delay period is time to permit temperature stabilization (block 788) and the sampling rate is set to one minute (block 790). The heating loopout is set to a first valve value (block 794) and a delay period is timed so discharge air temperature may be measured and stored (block 798). Preferably, the first valve value is 50%, although other values may be used. The heating loopout is then set to 100% (block 800) and another delay period is timed so discharge air temperature data may be collected (block 804). The heating loopout is then set to 0% (block 808) and another delay period is timed so discharge air temperature may be collected (block 810). The heating mode, day operational mode, and heating loopout are released (block 814) and the data are analyzed (block 858, FIG. 10*e*). If the test failed, no further test procedures are performed on the VAV box by test manager 58. If the test is passed, test manager 58 submits the VAV box to further test procedures.

If the VAV box has hot water heating and an auxiliary temperature sensor, the process determines whether it has one valve (block 820). If it does not then a testing status that the heating setup data are inaccurate is stored (block 824) and the procedure ends for that VAV box. If it has only one valve, a delay period is time to permit temperature stabilization (block 828) and the sampling rate is set to one minute (block 830). The heating loopout is set to 100% (block 834) and another delay period is timed so discharge air temperature data may be collected (block 840). The heating loopout is then set to 0% (block 844) and another delay period is timed so discharge air temperature may be collected (block 848). This delay period is preferably 10 minutes. The delay lengths are exemplary only. They depend upon the number of coils and the size of the coils. A preferred delay period between samples for auxiliary temperature sensing be between 120 to 600 seconds while the delay period for room temperature sensing to be between 900 and 1800 seconds. The heating mode, day operational mode, and heating loopout are released (block 850) and the data are analyzed and the results are stored (block 858). If the test failed, no further test procedures are performed on the VAV box by test manager 58. If the test is passed, test manager 58 submits the VAV box to further test procedures.

Figure 11:
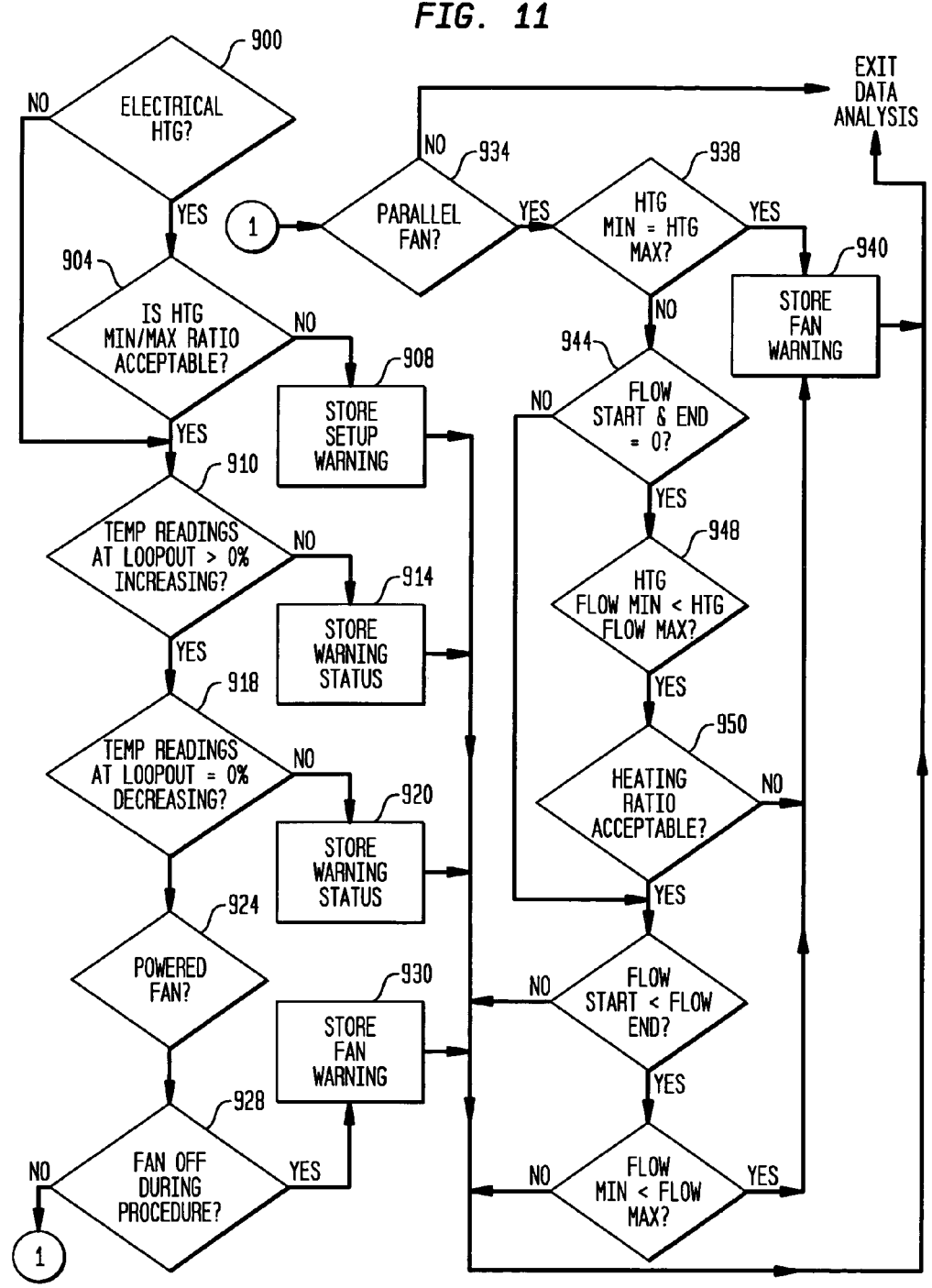
FIG. 11 is a flow diagram for an exemplary process for evaluating collected data for a heating function procedure that may be performed by the automated test tool of FIG. 2.

An exemplary analysis process performed on the heating function data is shown in FIG. 11. The process determines whether the VAV box has electrical heating or baseboard heating (block 900). If it does, the process determines whether the ratio of the heating flow minimum to heating flow maximum times 100 is less than the electrical heating flow parameter for the VAV box (block 904). If it is, a warning status regarding an inaccurate setup is generated (block 908). All temperature data during delay periods when the heating loopout was greater than 0% are evaluated to determine whether temperature increased during the period (block 910). If temperature does not increase, a warning status is generated (block 914). Otherwise, the temperature data during delay periods in which the heating loopout was 0% are evaluated to determine whether the temperature data were decreasing (block 918). If the temperature data are not decreasing for such periods, then a warning status is generated (block 920). The process also determines whether the VAV box has a powered fan (block 924). If it does, the process determines whether the fan was off at any time during the heating function procedure (block 928). If it was, a warning is generated for the VAV box (block 930). If the VAV box is has parallel powered fan control (block 934), the process determines whether heating flow minimum is equal to heating flow maximum (block 938). If these two values are equal, warning that the fan might not turn on is generated (block 940) because the value at which the fan turns on should be less than the flow value at which it turns off. The process also determines whether flow start and flow end are equal to zero (block 944). If they are equal to zero, it also determines whether heating flow minimum is less than the heating flow maximum (block 948). If it is, the process further determines whether the ratio of the heating flow minimum to the heating flow maximum time 100 is greater than either the parallel fan on value or the parallel fan off value (block 950). If that value is greater than either of the parallel fan values, then a warning status that the fan might not turn on is generated (block 940). The process also determines, for parallel fan control, whether the flow start value is less than the flow end value (block 958) and whether the heating flow minimum is less than the heating flow maximum (block 960). If both of these conditions are true, then a warning that the fan may turn off at the upper end of the heating range is generated (block 964).

Figure 12:
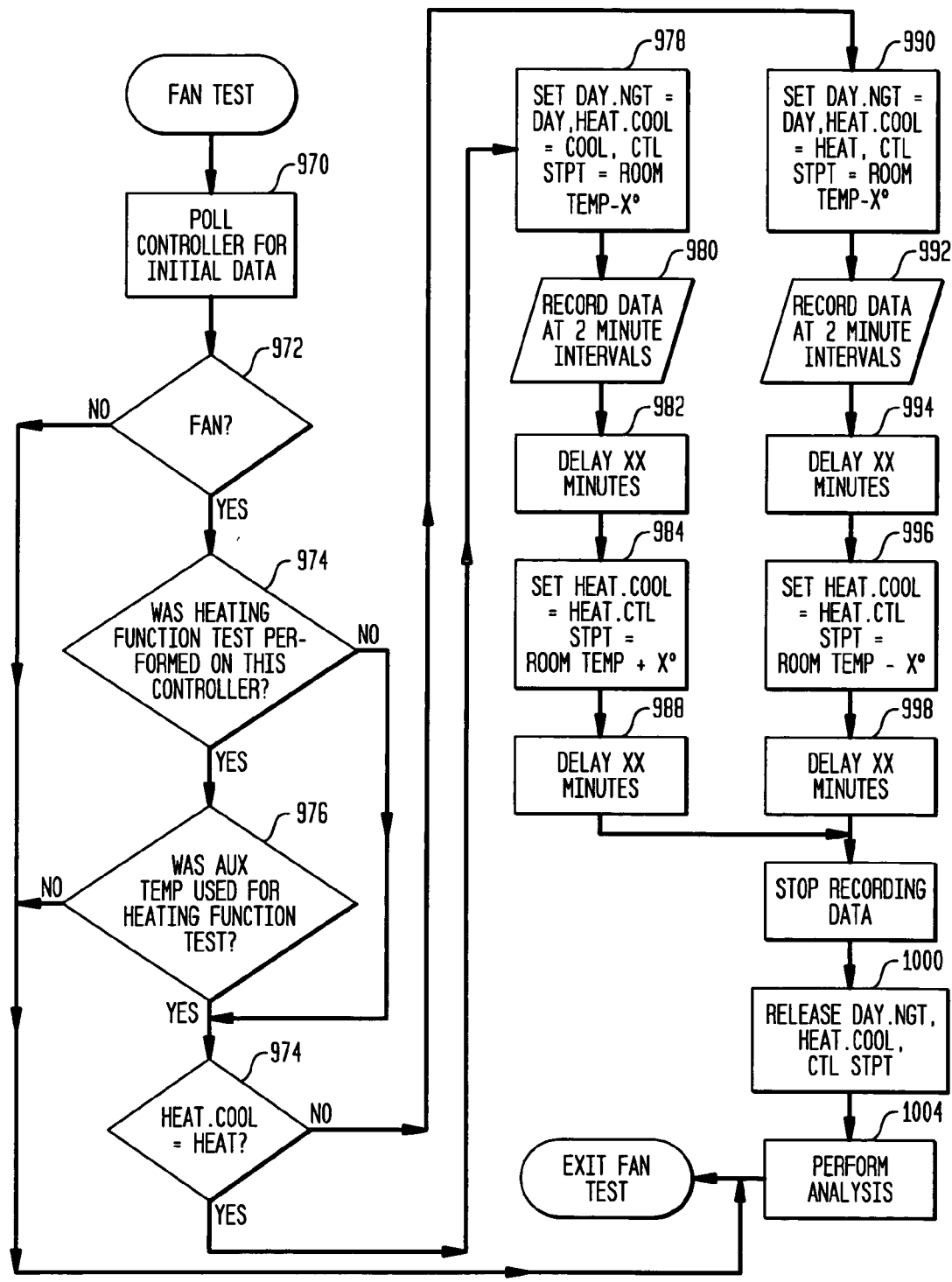
FIG. 12 is a flow diagram of an exemplary process for a control test procedure that may be performed by the automated test tool of FIG. 2.

The test manager 58 activates the control test procedure shown in FIG. 12 to test VAV boxes having powered fans only. The procedure is also performed, at least, after the heating function procedure because the procedure evaluates whether the VAV box effectively controls room temperature. If the heating function procedure was conducted by measuring room temperature for a fan powered VAV box, there is no need to also run the control function procedure because room temperature was measured during the heating function procedure if no auxiliary temperature sensor was available or operational. Therefore, the ability of the VAV box to control room temperature has already been evaluated.

The exemplary control test procedure shown in FIG. 12 begins by retrieving initial data from the VAV box (block 970). The VAV box identifier retrieved in the initial data is evaluated to determine whether a VAV box in the VAV procedure list has a powered fan (block 972). If it does not, the test procedure is not performed for this VAV box and the procedure is exited. If the VAV box has a powered fan, the process determines whether the heating function procedure was performed on this VAV box (block 974). If it was, the process determines whether the auxiliary temperature sensor was used for the heating function test (block 976). If it was not, the ability of the VAV box to control room temperature has already been evaluated so the procedure is exited. If the auxiliary temperature sensor was used for the heating function procedure, then the operator has manually set the control test to verify operation with the room temperature sensor and the process continues. If the heating mode is active, the day operational mode is set to day, the heating mode is set to cool, and the control set point is set to the current room temperature minus some temperature shift (block 978). The temperature shift may be adjustable. The sampling rate is also set for some period that enables meaningful data collection (block 980). An exemplary sampling rate is two minutes. A delay period corresponding to the sampling rate is timed so room temperature data may be collected and stored (block 982). The heating mode is then set to heat and the control set point is set to the room temperature plus the temperature shift (block 984). Again a delay period is timed so room temperature data may be collected (block 988). On the other hand, if the cooling mode was active (block 974), the day operational mode is set to day, the heating mode is set to heat, and the control set point is set to the current room temperature plus some temperature shift (block 990). The sampling rate is also set for a period time to enable meaningful data collection (block 992). Again, an exemplary rate is two minutes. A delay period is timed so room temperature data may be collected and stored (block 994). The heating mode is then set to cool and the control set point is set to the room temperature minus the temperature shift (block 996). Again a delay period is timed so room temperature data may be collected (block 998). The day operational mode, heating mode, and control set point are released (block 1000) and analysis of the collected data is performed so the results may be stored (block 1004). The procedure is then exited. Preferably, the temperature interval for the control function procedure is 3 degrees.

Figure 13A:
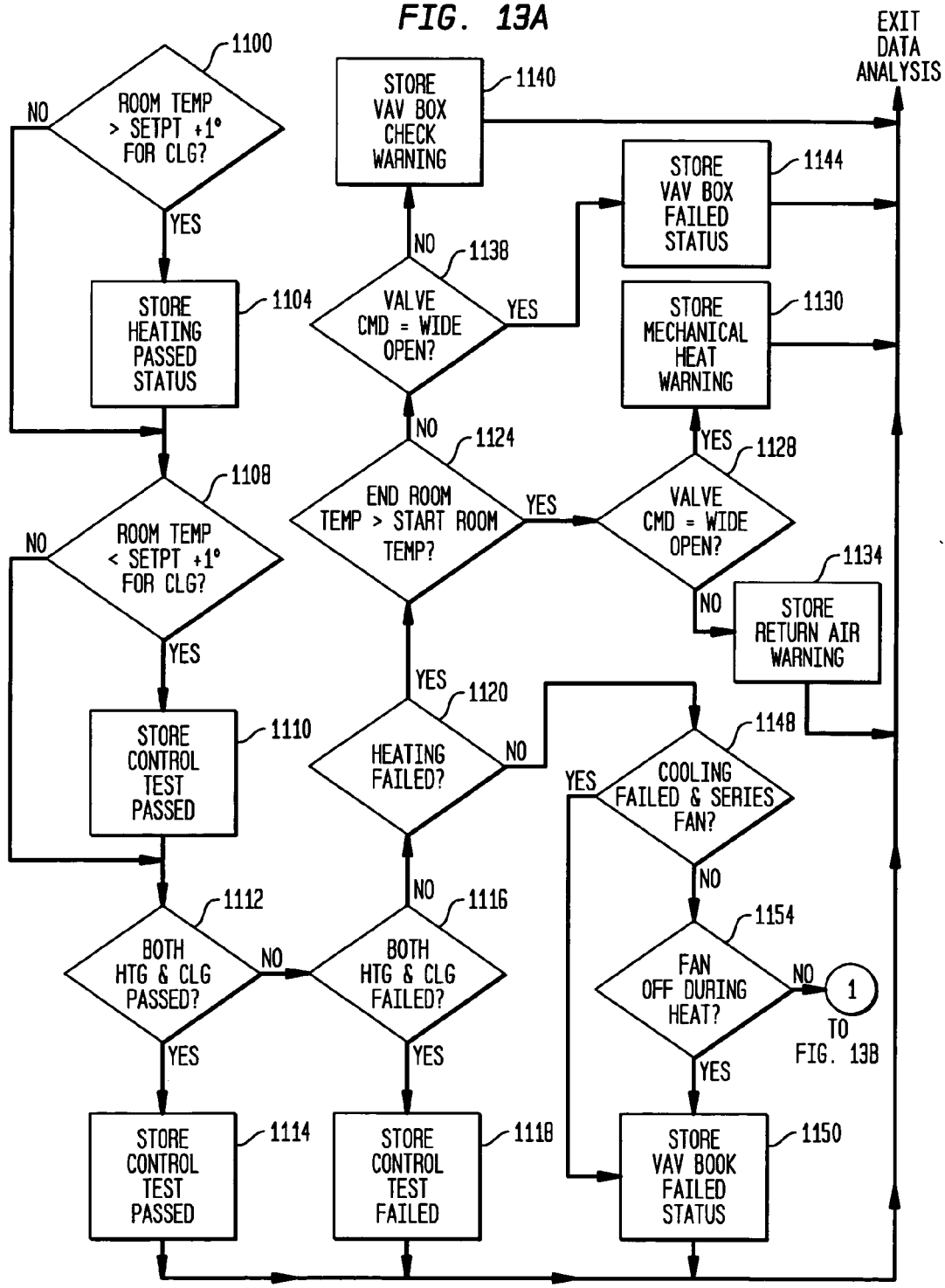
FIGS. 13a and 13b are flow diagrams for an exemplary process for evaluating data collected during a control test procedure that may be performed by the automated test tool of FIG. 2.
Figure 13B:
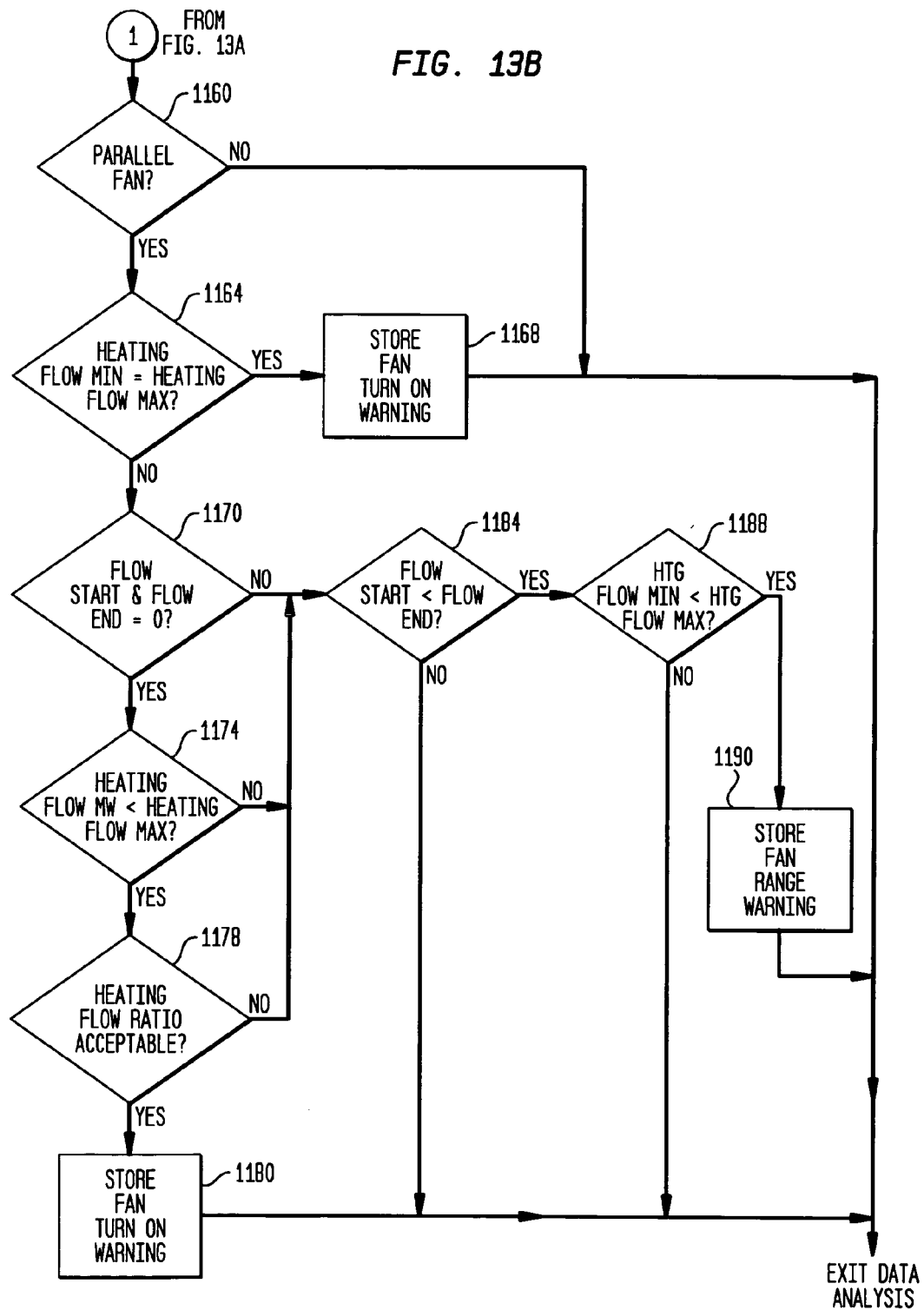

An exemplary process for evaluating the room temperature data collected during the control test procedure is shown in FIG. 13. For a VAV box tested during the control test procedure, the process determines whether the room temperature is greater than the control set point −1° when the heating mode was active (block 1100). The adjustment to the control set point may be adjustable. If it was, then the heating control procedure was passed (block 1104). The process also determines whether the room temperature is less than the control set point plus 1° when the cooling mode was active (block 1108). The 1 degree offset may be adjustable. If it was, then the cooling procedure was passed (block 1110). If both the heating control and cooling control procedures were passed (block 1112), then the VAV box passed (block 1114). Conversely if both heating and cooling control procedures failed (block 1116), the VAV box failed (block 1118). If the VAV box only failed the heating mode procedure (block 1120), then the process determines whether the room temperature at the end of the heating control procedure was slightly greater than the room temperature at the beginning of the heating control procedure (block 1124). If it was, then the process determines whether the valve command in a hot water heated VAV box indicates the valve command and valve position are approximately wide open (block 1128). If those conditions exist, then a warning is generated that the VAV box is working but adequate mechanical heat is not being supplied to the VAV box (block 1130). Otherwise, a VAV box warning is generated that the return air may not have enough heat for space warming (block 1134). If the room temperature at the end of the heating control procedure was approximately the same or less than the beginning room temperature (block 1124), then the process determines whether the valve command in a hot water heated VAV box indicates the valve command and valve position are approximately wide open (block 1138). If those conditions exist, then a warning is generated that the VAV box needs to be checked (block 1140). Otherwise, a VAV box warning is generated that the VAV box failed (block 1144). If the cooling test failed and the VAV box has a series powered fan (block 1148), a VAV box failed message is generated (block 1150). The process also determines whether the fan was ever off during the heating control procedure (block 1154). If it was, then a VAV box failed message is generated (block 1150).

The process also determines whether a VAV box is a parallel powered fan VAV box (block 1160). If it is, the process determines whether heating flow minimum is equal to heating flow maximum (block 1164). If these two values are equal, warning that the fan might not turn on is generated (block 1168) because the value at which the fan turns on should be less than the flow value at which it turns off. The process also determines whether flow start and flow end are equal to zero (block 1170). If they are equal to zero, it also determines whether heating flow minimum is less than the heating flow maximum (block 1174). If it is, the process further determines whether the ratio of the heating flow minimum to the heating flow maximum time 100 is greater than either the parallel fan on value or the parallel fan off value (block 1178). If that value is greater than either of the parallel fan values, then a warning status that the fan might not turn on is generated (block 1180). The process also determines, for parallel fan control, whether the flow start value is less than the flow end value (block 1184) and whether the heating flow minimum is less than the heating flow maximum (block 1188). If both of these conditions are true, then a warning that the fan may turn off at the upper end of the heating range is generated (block 1190).

The test manager 58 may also include a damper curve module and a temperature trend data module. The damper curve module generates a curve that plots the measured air flow against the damper position. The temperature trend data module generates a curve that plots the measured temperature data for a procedure against time with an indication of the electric stages or valves that were on at a particular time. All procedure results, data, and status messages may also be printed by test manager 58.

While the present invention has been illustrated by the description of exemplary processes and system components, and while the various processes and components have been described in considerable detail, applicants do not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicants' general inventive concept.

What is claimed is:

1. A system for automatically testing in parallel multiple variable air volume (VAV) boxes coupled to the same floor level network comprising:
    a building level network interface for communicating with a floor level network from a building level network; and
    a test manager for sending at least one test parameter to a plurality of variable air volume (VAV) boxes coupled to the floor level network so that at least two VAV boxes are responding to the one test parameter at approximately the same time, the test manager operable to send different test parameters to different VAV boxes based on different design configurations of the different VAV boxes.

2. The system of claim 1 wherein the test manager sends through the building level network interface at least one test parameter associated with a first test procedure to a first VAV box coupled to the floor level network; and
    also sends through the building level network interface at least one test parameter associated with a second test procedure to a second VAV box coupled to the floor level network so that the first and second VAV boxes are responding to a test parameter associated with different test procedures at approximately the same time.

3. The system of claim 1, wherein the test manager sends a calibration procedure parameter to a first VAV box coupled to the floor level network; and
    the test manager delays before sending the calibration procedure parameter to a second VAV box coupled to the floor level network so that the first and second VAV boxes are not responding to the calibration procedure parameter at the same time.

4. The system of claim 1, the test manager further comprising:
    a receiver for receiving test messages from the VAV boxes coupled to the floor level network in response to the at least one test parameter sent to the VAV boxes; and
    an analyzer for analyzing the test messages received from the VAV boxes to determine whether a VAV box passed a test.

5. The system of claim 4, wherein the analyzer determines a cause for a test failure from at least one test message received from at least one VAV box.

6. The analyzer of claim 4, further comprising:
    a warning generator for generating a warning in response to a VAV box passing a test, the warning indicating a marginal condition in the VAV box.

7. The system of claim 1, wherein the test manager polls through the building level network interface a plurality of devices coupled to the floor level network and stores identifiers in a VAV procedure list that correspond to VAV boxes coupled to the floor level network.

8. The system of claim 1 further comprising:
    a data repository for storing at least one test parameter for a calibration procedure, an auto zero module procedure, a damper operation and airflow procedure, a heating function procedure, and a control function procedure; and
    the test manager sends at least one test parameter from each procedure stored in the data repository to at least one of the VAV boxes coupled to the floor level network.

9. The system of claim 8, wherein the test manager terminates testing of a VAV box coupled to the floor network in response to the VAV box failing to calibrate.

10. The system of claim 8, wherein the test manager determines whether a temperature message received from a VAV box in response to a test parameter for the heating function procedure contains a room temperature or a discharge temperature.

11. A method for automatically testing with a processor multiple variable air volume (VAV) boxes coupled to a network comprising:
    determining a first test procedure to be conducted with the first VAV box based at least in part upon an identified type of the first VAV box;
    determining a second test procedure to be conducted with the second VAV box based at least in part upon an identified type of the second VAV box, the identified type of the second VAV box different from the identified type of the first VAV box and the second test procedure different from the first test procedure;
    sending at least one test parameter associated with the first test procedure to the first VAV box;
    controlling the first VAV box based upon the at least one test parameter associated with the first test procedure; and
    sending at least one test parameter associated with the second test procedure to the second VAV box so that the first and second VAV boxes are responding to the respectively received at least one first and second test procedure parameter at about the same time controlling the second VAV box based upon the at least one test parameter associated with the second test procedure.

12. The method of claim 11 further comprising:
    sending a calibration procedure parameter to the first VAV box;
    delaying for a predetermined amount of time; and
    sending the calibration procedure parameter to a second VAV box after the delay so that the first and second VAV boxes are not responding to the calibration procedure parameter at the same time.

13. The method of claim 11 further comprising:
    receiving test messages from the first and the second VAV boxes in response to the respectively received at least one first and second test procedure parameter;
    determining if the first and the second VAV boxes passed the first and second test procedure, respectively; and
    identifying each VAV box that did not pass the respective test procedure.

14. The method of claim 13, further comprising:
    determining if the first and the second VAV boxes passed the first and second test procedure, respectively, within a predetermined margin; and generating a warning in response to each VAV box that passed the respective test within the predetermined margin.

15. The method of claim 11 further comprising:
polling a plurality of devices coupled to the network;
receiving an identifier from each of the plurality of devices in a response to the polling; and
storing the received identifier in a VAV procedure list in response to a determination that the device is a VAV box.

16. A building control system comprising:
a network;
a first variable air volume (VAV) box of a first type coupled to the network;
a second VAV box of a second type coupled to the network, wherein the second type is a type different from the first type; and
a test manager operable to execute a plurality of tests and programmed to
identify VAV boxes coupled to the network
determine the type of the VAV boxes coupled to the network and
select from the plurality of tests a set of tests to be conducted for each type of VAV box identified on the network.

17. The building control system of claim 16, wherein the plurality of tests comprises:
a calibration test;
an auto zero test;
a damper operation and airflow test;
a heating function test; and
a control test.

18. The building control system of claim 16, wherein:
the first type of VAV box includes a heating function;
the second type of VAV box does not include a heating function;
the set of tests to be conducted for the first type of VAV box includes a heating function test; and
the set of tests to be conducted for the second type of VAV box does not include a heating function test.

19. The building control system of claim 16 wherein:
the first type of VAV box includes an electrical heating function;
the second type of VAV box includes a hot water heating function;
the set of tests to be conducted for the first type of VAV box includes an electrical heating function test; and
the set of tests to be conducted for the second type of VAV box includes a hot water heating function test.

20. The building control system of claim 16, wherein:
the set of tests to be conducted for the first type of VAV box includes at least one test;
the set of tests to be conducted for the second type of VAV box includes at least one test; and
the at least one test for the first type of VAV box is conducted at approximately the same time as the at least one test for the second type of VAV box.

* * * * *